United States Patent
Facius et al.

(10) Patent No.: US 7,905,600 B2
(45) Date of Patent: Mar. 15, 2011

(54) IMAGING UNIT FOR COLOR PROJECTION ENGINE COMPRISING REFLECTIVE DISPLAYS

(75) Inventors: Zoltan Facius, Waiblingen (DE); Markus Kamm, Karlsruhe (DE)

(73) Assignee: Sony Deutschland GmbH, Cologne (DE)

( * ) Notice: Subject to any disclaimer, the term of this patent is extended or adjusted under 35 U.S.C. 154(b) by 1105 days.

(21) Appl. No.: 11/628,450

(22) PCT Filed: Jun. 24, 2005

(86) PCT No.: PCT/EP2005/006859
§ 371 (c)(1),
(2), (4) Date: Dec. 4, 2006

(87) PCT Pub. No.: WO2006/002839
PCT Pub. Date: Jan. 12, 2006

(65) Prior Publication Data
US 2007/0273836 A1 Nov. 29, 2007

(30) Foreign Application Priority Data

Jun. 25, 2004 (EP) .................................. 04014965

(51) Int. Cl.
*G03B 21/14* (2006.01)
(52) U.S. Cl. ........................................... 353/20
(58) Field of Classification Search .................. 353/20, 353/31; 359/490, 495, 502
See application file for complete search history.

(56) References Cited

U.S. PATENT DOCUMENTS

| | | | |
|---|---|---|---|
| 6,343,864 B1 * | 2/2002 | Tajiri | 353/20 |
| 6,550,919 B1 | 4/2003 | Heine | |
| 6,628,346 B1 * | 9/2003 | Ebiko | 349/9 |
| 6,789,902 B2 * | 9/2004 | Hayashi et al. | 353/20 |
| 2003/0189676 A1 | 10/2003 | Kato et al. | |
| 2004/0001186 A1 * | 1/2004 | Yamamoto | 353/31 |

FOREIGN PATENT DOCUMENTS

| | | |
|---|---|---|
| CN | 1463384 A | 12/2003 |
| WO | WO 00/58772 | 10/2000 |
| WO | WO 00/70403 | 11/2000 |

* cited by examiner

*Primary Examiner* — Georgia Y Epps
*Assistant Examiner* — Danell L Owens
(74) *Attorney, Agent, or Firm* — Oblon, Spivak, McClelland, Maier & Neustadt, L.L.P.

(57) ABSTRACT

An imaging unit including a first spectral splitting and illumination part and a second spectral splitting and recombination part. Within the first spectral splitting part received white light is split up into a first spectral component and a second spectral component. In the second spectral splitting part the second spectral component is split up into a third spectral component and a fourth spectral component. Additionally, first, second, and third partial images of an image to be generated are produced with respect to the first, third, and fourth spectral components of the white light. The first, second, and third partial images are recombined to obtain a recombined or reproduced image. The second spectral and polarization selective splitting and recombination part includes a dichloric beam splitting device and first and second polarization selective or polarizing beam splitting devices.

39 Claims, 14 Drawing Sheets

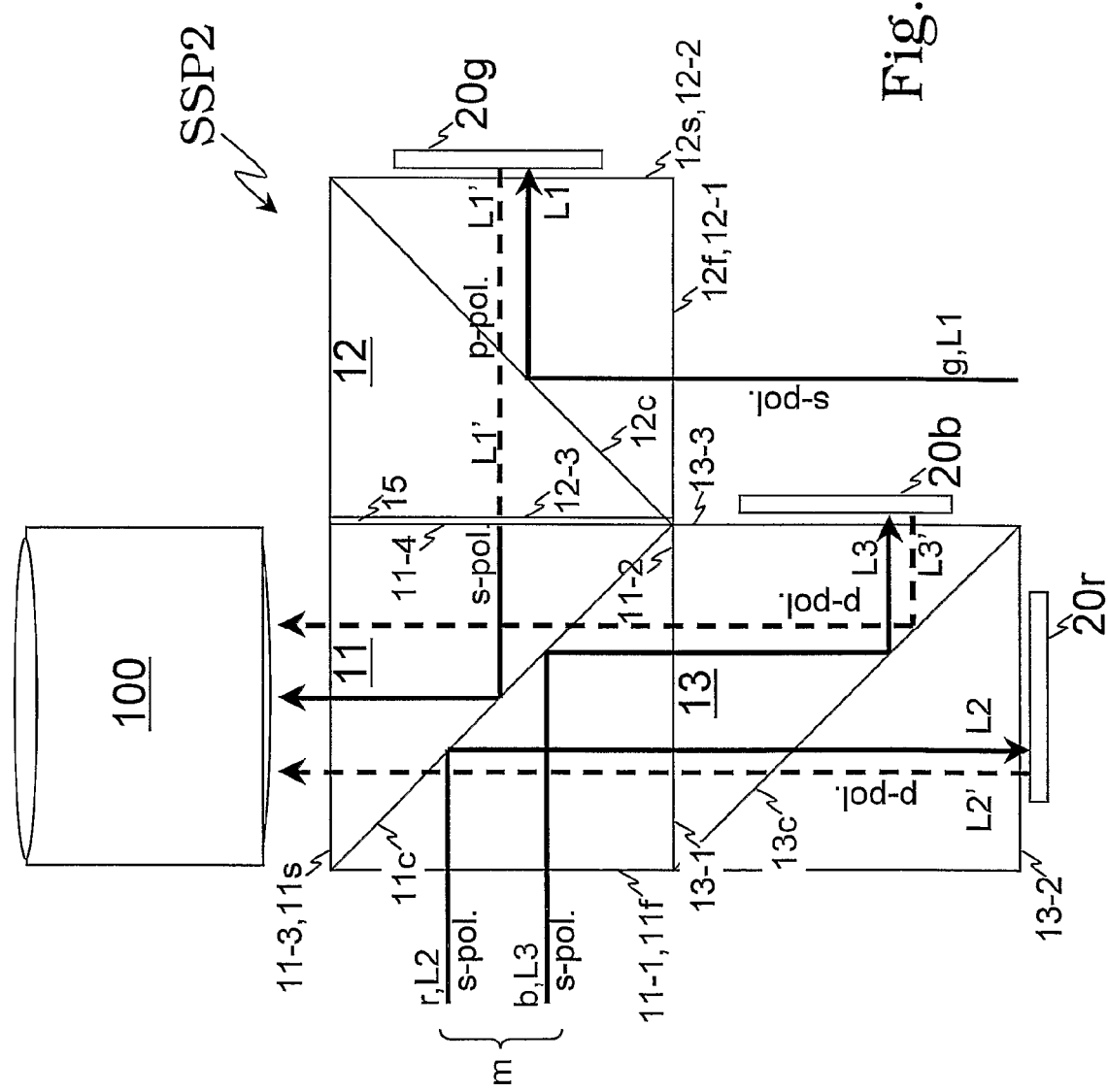

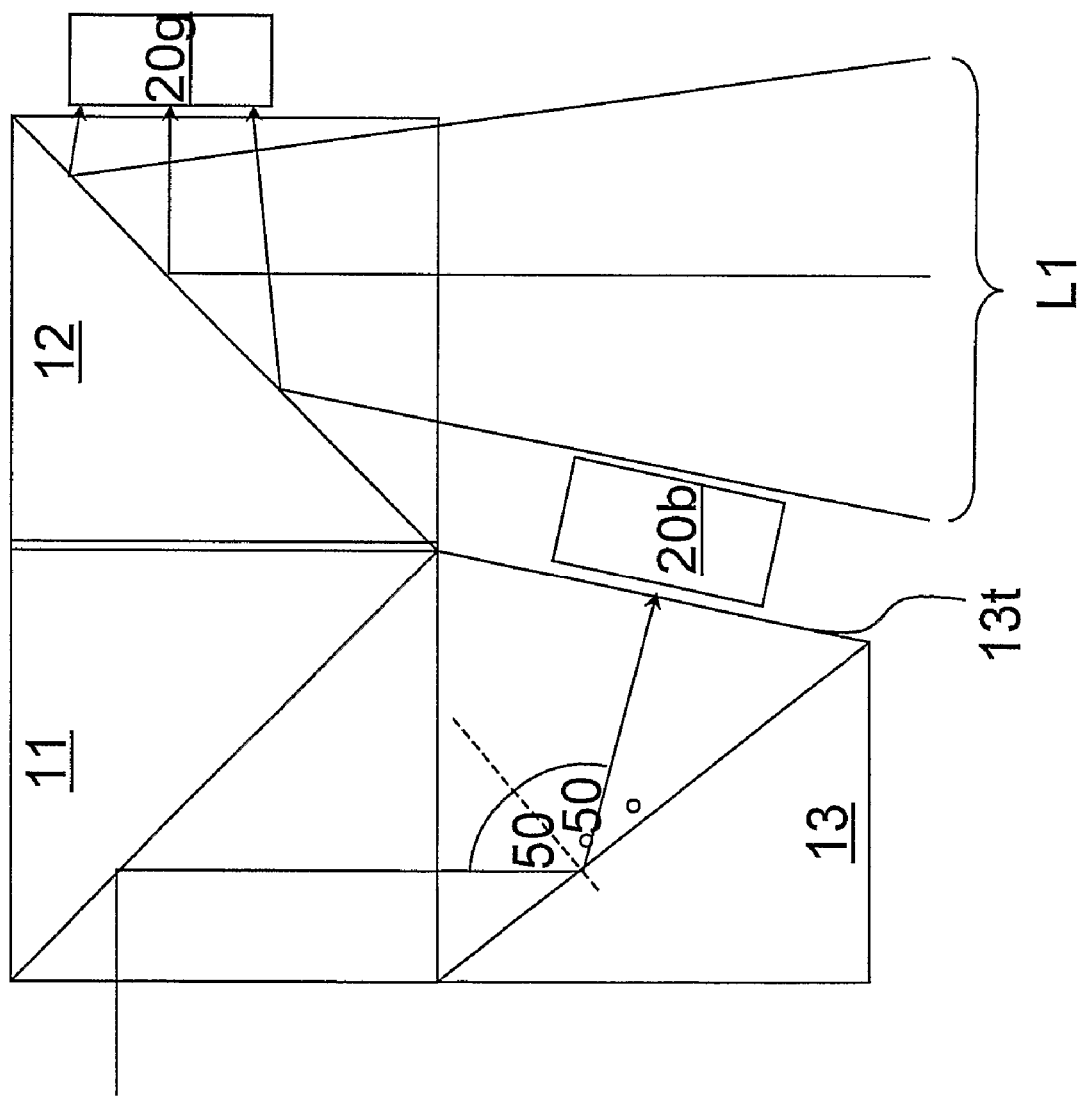

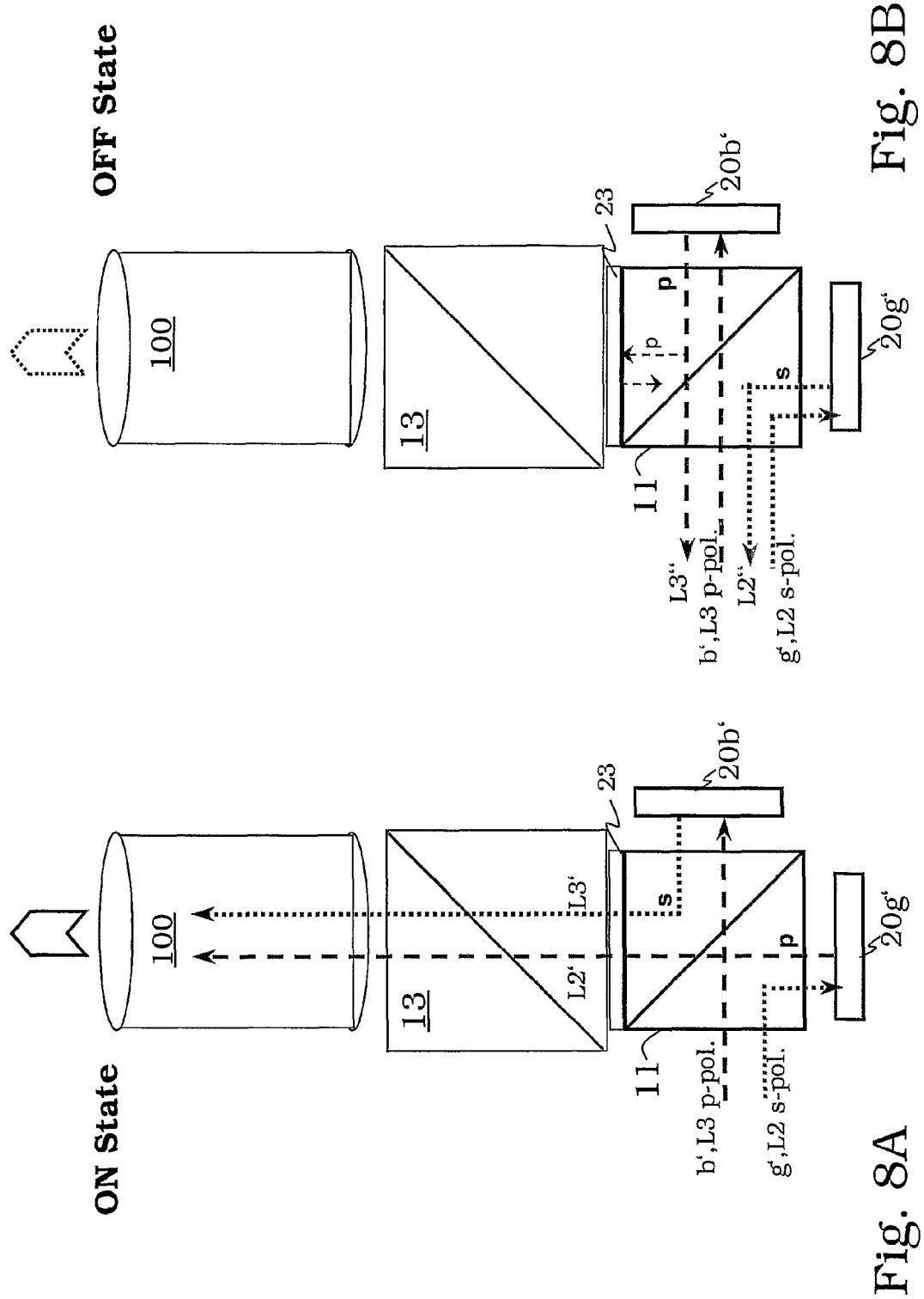

IMAGING UNIT FOR COLOR PROJECTION ENGINE COMPRISING REFLECTIVE DISPLAYS

BACKGROUND

The present invention relates to an imaging unit and in particular to an imaging unit for a projection engine or the like.

Imaging units, in particular in projection engines or projection systems, use imager devices or image generating devices for producing partial images for a image to be reproduced. After generation of the partial images light quantities thereof are subjected to a superposition to arrive at reproduced images which is representative for the image to be introduced. Generally, for supplying the image generating devices or means with light, light of a base spectrum for instance, essentially white light, is generated or received and then split up into different spectral components each of which being provided for a distinct image generating means.

SUMMARY

It is an object of the present invention to provide an imaging unit, in particular for a projection engine or the like, which is capable of realizing the processes of splitting up illumination light of a base spectrum, producing partial images, and of recombining light for the partial images of distinct spectral components by involving a particular simple optical structure.

The object is achieved by imaging units according to the characterizing features of the independent claim 33. Preferred embodiments of the inventive imaging unit are within the scope of the respective dependent sub-claims.

The imaging units according to the present invention and therefore first and second solutions of the object comprise a first spectral selective splitting and/or illumination part and/or the like and a second spectral and polarization selective splitting and/or recombination part. It is in particular adapted for or provided with reflective display devices.

According to the present invention said first spectral selective splitting and/or illumination part and/or the like is adapted for providing and/or for receiving essentially white light, for splitting up said essentially white light—in particular of a first or s-polarized polarization state—into a first spectral component and into a second spectral component which in a sense is the complementary to said first spectral component with respect to said essentially white light.

Said second spectral and polarization selective splitting and/or recombination part is according to the present invention in its broadest sense adapted for receiving said first and second spectral components in spatially separated form and under non-coincident angles or in a non-parallel manner for splitting up said second spectral components into a third spectral component and a fourth spectral component which is essentially complementary to said third spectral component with respect to said second spectral component, and for generating first, second and third partial images of an image to be generated and/or to be reproduced using said first, third and fourth spectral components, respectively. Additionally, said second spectral splitting and/or recombination part is adapted for recombining said first, second and third partial images to a recombined image being representative for said image to be generated and/or to be reproduced.

The present invention may further be characterized in that said second spectral and polarization selective splitting and/ or recombination part consists of or comprises a dichroic beam splitting device and first and second polarization selective or polarizing beam splitting devices.

It is therefore a basic aspect of the present invention to split up the structure of the imaging unit and thereby the processing performed by the imaging unit into a first spectral splitting and/or illumination part and into a second spectral splitting and/or recombination part. In the first spectral splitting and/or illumination part a process of pre-splitting up the light of the base spectrum, i.e. the essentially white light is performed, thereby generating first spectral components and a second spectral component of said essentially white light, the latter being essentially complementary to said first spectral component the first essentially white light. Then, both first and second spectral components are fed into said second spectral splitting and/or recombination part or further processing these components, i.e. for further splitting up the second spectral component, for producing partial images of an image to be generated and/or to be reproduced, and for recombining or to producing a superposition of the distinct partial images, i.e. of the lights within the distinct spectral components.

It is an additional basic aspect of the present invention that said second spectral and polarization selective splitting and/ or recombination part consists of or comprises a dichroic beam splitting device and first and second polarization selective or polarizing beam splitting devices.

In the following, alternative or additional features of the first solution are described:

According to a preferred embodiment of the imaging unit according to the present invention said second spectral splitting and/or recombination part comprises a dichroic beam splitting device which is in particular adapted and/or arranged for splitting up said second spectral component into said third and fourth spectral components.

According to a further alternative of the present invention said second spectral splitting and/or recombination part comprises a first polarizing beam splitting device, which is in particular adapted and/or arranged for receiving light of said first spectral component—in particular of said first or s-polarized polarization state—or a derivate thereof under said first spectral splitting and/or illumination part.

In this case, said first polarizing beam splitting device comprises a first surface being adapted and/or arranged for having said light of said spectral component entered said first polarizing beam splitting device.

Alternatively or additionally, said first polarizing beam splitting device comprises a second surface being adapted and/or arranged for having light of said first spectral component—in particular of said first or s-polarized polarization state—left said first polarizing beam splitting device, in particular to have said light of said first spectral component interact with a first image generating means for said first partial image.

In this case, said second surface of said first polarizing beam splitting device may be adapted and/or arranged for having light of said first partial image—in particular in a second or p-polarized polarization state—entered said polarizing beam splitting device.

According to a further alternative of the present invention, said first polarizing beam splitting device comprises a third surface being adapted and/or arranged by having said light of said first partial image—in particular of said second or p-polarized polarization state—left said first polarizing beam splitting device.

Further additionally or alternatively, said first polarizing beam splitting device comprises a polarization selecting interface being adapted and/or arranged to the essentially reflect light of said first or s-polarized polarization state and to have essentially transmit light of said second or p-polarized polarization state. In particular, said polarization selecting interface is adapted and/or arranged to recollect and redirect said light of said first spectral component from said first surface of said first polarizing beam splitting device to said second surface of said first polarizing beam splitting device and to transmit the p-polarized part of said light of said first partial image from said second surface of said first polarizing beam splitting device to said third surface of said first polarizing beam splitting device and to reflect the s-polarized part of said first partial image from said second surface of said first polarizing beam splitting device to said first surface of said first polarizing splitting device.

According to a further alternative of the inventive imaging unit, said second spectral splitting and/or recombination part comprises a second polarizing beam splitting device. This is in particular adapted and/or arranged for receiving lights of said second spectral components—in particular of a first or s-polarized polarization state—or a derivative thereof from said first spectral splitting and/or illumination part.

In this case, said second polarizing beam splitting device comprises a first surface being adapted and/or arranged for having light of said second spectral component—in particular of said first or s-polarized polarization state—entered said second polarizing beam splitting device.

Additionally, said second polarizing beam splitting device may comprise a second surface being adapted and/or arranged for having light of said second spectral component—in particular of said first or s-polarized polarization state—left said second polarizing beam splitting device, in particular to have said light of said second spectral component interact with a dichroic beam splitting device and/or with second and third image generating means for said second and third partial images, respectively.

In this case, said second surface of said second polarizing beam splitting device may be adapted and/or arranged for having light of said second and third partial images entered said second polarizing beam splitting device. According to a further preferred embodiment of the inventive imaging unit, said second polarizing beam splitting device may comprise a third surface being adapted and/or arranged for having light of said second and third partial images—in particular of said second or p-polarized polarization state—left said second polarizing beam splitting device.

It is of further advantage, when said second polarizing beam splitting device comprises a polarization selective interface being adapted and/or arranged to essentially reflect a light of said first or s-polarized polarization state and to essentially transmit light of said second or p-polarized polarization state. In this case, said polarization selective interface of said second polarizing beam splitting device may be adapted to reflect and redirect said light of said second spectral component from said first surface of said second polarizing beam splitting device to said second surface of said second polarizing beam splitting device and to transmit the p-polarized part of said light of said second and third partial images from said second surface of said second polarizing beam splitting device to said third surface of said second polarizing beam splitting device and to reflect the s-polarized part of said light to said first surface of said second polarizing beam splitting device.

Further additionally, said second polarizing beam splitting device comprises a fourth surface being adapted and/or arranged for having said light of said first partial image entered said second polarizing beam splitting device, in particular in said first or s-polarized polarization state.

According to a further preferred embodiment of the present invention said third surface of said second polarizing beam splitting device is adapted and/or arranged for having said light of said first partial images left said second polarizing beam splitting device.

According to a further alternative of the present invention said polarization selecting interface of said second polarizing beam splitting device is adapted and/or arranged for having said light of said first partial image reflected from said fourth surface of said second polarizing beam splitting device to said third surface of said second polarizing beam splitting device.

According to a further alternative of the present invention said second spectral splitting and/or recombination part comprise a dichroic beam splitting device. This dichroic beam splitting device is in particular adapted and/or arranged for receiving said light of said second spectral component from said second polarizing beam splitting device and/or for splitting up said light of said second spectral component into light of said third spectral component and light of said fourth spectral component. According to this particular measure, apart of the spectral separation or splitting up is carried out within said second spectral splitting and/or recombination part of the inventive imaging unit.

It is of particular advantage to have said dichroic beam splitting device comprise a first surface being adapted and/or arranged for having said light of said second spectral component entered said dichroic beam splitting device.

Additionally or alternatively, said dichroic beam splitting device comprises a second surface being adapted and/or arranged for having said light of said third spectral component left said dichroic beam splitting device, in particular to have said light of said third spectral component interact with a second image generating means for said second partial image.

In this case, said second surface of said dichroic beam splitting device may be arranged for having light of said second partial image entered said dichroic beam splitting device.

It is of a further advantage, to have said dichroic beam splitting device comprise a third surface being adapted and/or arranged for having said light of said fourth spectral component left said dichroic beam splitting device, in particular to have said light of said fourth spectral component interact with a third image generating means for said third partial image.

In this case, said third surface of said dichroic beam splitting device may be adapted and/or arranged for having light of said third partial image enter the dichroic beam splitting device.

According to a further advantageous embodiment of the inventive imaging unit, said dichroic beam splitting device may comprise a spectral selective interface being adapted and/or arranged to essentially transmit light within said third spectral component and/or to essentially reflect light with said fourth spectral component and thereby for splitting up said second spectral component into said third spectral component and said fourth spectral component.

According to a further alternative of the present invention said first and second polarizing beam splitting devices may be adapted and/or arranged to enable said third surface of said first polarizing beam splitting device and said fourth surface of said second polarizing beam splitting device to essentially face each other.

In this case, it is of further advantage to have a half-wave retarder device provided—in particular between said third surface of said first polarizing beam splitting device and said fourth surface of said second polarizing beam splitting device—for changing the polarization state of said light of said first partial image exiting said first polarizing beam splitting device from said second or p-polarized polarization state to said first or s-polarized polarization state before entering said second polarizing beam splitting device via said fourth surface thereof.

It may of further advantage to have said second polarizing beam splitting device and said dichroic beam splitting device adapted and/or arranged to enable said second surface of said second polarizing beam splitting device and said first surface of said dichroic beam splitting device to essentially face each other.

Further on, said polarization selective interface of said first polarizing beam splitting device and said second polarizing beam splitting device and/or said dichroic or spectral selective interface of said dichroic beam splitting device may be adapted and/or arranged to essentially show a 45°-configuration and/or -geometry.

Alternatively, said polarization selective interface of said first polarizing beam splitting device and said second polarizing beam splitting device and/or said dichroic or spectral selective interface of said dichroic beam splitting device may be adapted and/or arranged to essentially show a non-45°-configuration and/or -geometry, in particular essentially a 50'-configuration and/or -geometry.

According to a further preferred embodiment of the inventive imaging unit said first spectral splitting and/or illumination part may comprise a spectral splitting, in particular a dichroic mirror—being adapted to split up said received and/or generated essentially white light into said first spectral component and said second spectral component and in particular to redirect said first spectral component to said first surface of said first polarizing beam splitting device and second spectral component to said first surface of said polarizing beam splitting device.

According to the present invention said first, second, and/or third image generating means may be reflective liquid crystal display devices, liquid-crystal-on-silicon or LCoS-devices and/or the like.

In the following, alternative or additional features of the second solution are described:

In a preferable alternative of the imaging unit according to the second solution said first polarization selective or polarizing beam splitting device is adapted and/or arranged for receiving light of said first spectral component—in particular of said first or s-polarized polarization state—or a derivative thereof from said first spectral splitting and/or illumination part.

Further preferably, said first polarization selective or polarizing beam splitting device may comprise a first surface being adapted and/or arranged for having said light of said first spectral component—in particular of said first or s-polarized polarization state—entered said first polarizing beam splitting device.

Additionally or alternatively, said first polarization selective or polarizing beam splitting device may comprise a second surface being adapted and/or arranged for having light of said first spectral component—in particular of said first or s-polarized polarization state—left said first polarization selective or polarizing beam splitting device (12), in particular to have said light of said first spectral component interact with a first image generating means for said first partial image.

According to a further embodiment said second surface of said first polarization selective or polarizing beam splitting device is adapted and/or arranged for having light of said first partial image entered said first polarization selective or polarizing beam splitting device (12).

According to a preferred embodiment said first polarization selective or polarizing beam splitting device may comprise a third surface being adapted and/or arranged for having said light of said first partial image—in particular of said second or p-polarized polarization state—left said first polarization selective or polarizing beam splitting device.

According to a further embodiment said first polarization selective or polarizing beam splitting device comprises a polarization selective interface being adapted and/or arranged: to essentially reflect light of said first or s-polarized polarization state and to essentially transmit light of said second or p-polarized polarization state, in particular to reflect and redirect said light of said first spectral component from said first surface of said first polarization selective or polarizing beam splitting device to said second surface of said first polarization selective or polarizing beam splitting device and to transmit the p-polarized part of said light of said first partial image from said second surface of said first polarization selective or polarizing beam splitting device to said third surface of said first polarization selective or polarizing beam splitting device and to reflect the s-polarized part of said light of said first partial image from said second surface of said first polarization selective or polarizing beam splitting device to said first surface of said first polarization selective or polarizing beam splitting device.

Preferably, said second polarization selective or polarizing beam splitting device is adapted and/or arranged for splitting up said second spectral component into said third and fourth spectral components.

Further preferably, said second polarization selective or polarizing beam splitting device is adapted and/or arranged for receiving light of said second spectral component—in particular of a first or s-polarized polarization state of the third spectral component and/or of said second or p-polarized polarization state of the fourth spectral component—or a derivative thereof from said first spectral splitting and/or illumination part.

Additionally or alternatively, said second polarization selective or polarizing beam splitting device comprises a first surface being adapted and/or arranged for having light of said second spectral component and in particular of said third and fourth spectral components—in particular of said first or s-polarized polarization state of the third spectral component and/or of said second or p-polarized polarization state of the fourth spectral component—entered said second polarization selective or polarizing beam splitting device. In a further embodiment said second polarization selective or polarizing beam splitting device comprises a second surface being adapted and/or arranged for having light of said second spectral component and in particular of said third and fourth spectral components and/or light of said second and third partial images left said second polarization selective or polarizing beam splitting device, in particular to have said light of said second spectral component and in particular of said third and fourth spectral components and/or light of said second and third partial images interact with said dichroic beam splitting device.

According to a further alternative or additionally said second polarization selective or polarizing beam splitting device comprises a third surface and a fourth surface are respectively adapted and/or arranged for having light of said second spectral component and in particular light of said fourth spectral component and light of said third spectral component—in particular of said first or s-polarized polarization state of the third spectral component and/or in a second or p-polarized polarization state of the fourth spectral component—left said second polarization selective or polarizing beam splitting device, in particular to have said light of said second spectral component and in particular of said third and fourth spectral components interact with respective second and third image generating means in order to generate light of said second and third partial images and therefore said second and third partial images, and/or for having said light of said second and third partial images respectively enter said second polarization selective or polarizing beam splitting device.

Additionally or alternatively said second surface of said second polarization selective or polarizing beam splitting device is adapted and/or arranged for having light of said second and third partial images—in particular of said second or p-polarized polarization state of the third spectral component and/or in a first or s-polarized polarization state of the fourth spectral component—left said second polarization selective or polarizing beam splitting device.

According to a further embodiment said second polarization selective or polarizing beam splitting device comprises a polarization selective interface being adapted and/or arranged: to essentially reflect light of said first or s-polarized polarization state and to essentially transmit light of said second or p-polarized polarization state, and/or to reflect and redirect said light of said third spectral component from said first surface of said second polarization selective or polarizing beam splitting device to said fourth surface of said second polarization selective or polarizing beam splitting device, and/or to transmit the p-polarized part of said light of said second partial images from said fourth surface of said second polarization selective or polarizing beam splitting device to said second surface of said second polarization selective or polarizing beam splitting device and to reflect the s-polarized part of said light of said second partial images from said fourth surface of said second polarization selective or polarizing beam splitting device to said first surface of said second polarization selective or polarizing beam splitting device, and/or to transmit said light of said fourth spectral component from said first surface of said second polarization selective or polarizing beam splitting device to said third surface of said second polarization selective or polarizing beam splitting device, and/or to reflect and redirect the s-polarized part of said light of said third partial image from said third surface of said second polarization selective or polarizing beam splitting device to said second surface of said second polarization selective or polarizing beam splitting device and to transmit the p-polarized part of said light of said third partial images from said third surface of said second polarization selective or polarizing beam splitting device to said first surface of said second polarization selective or polarizing beam splitting device.

In a further embodiment said dichroic beam splitting device is adapted and/or arranged: for receiving light of said first partial image from said first polarization selective or polarizing beam splitting device, and/or for receiving light of said second and third partial images from said second polarization selective or polarizing beam splitting device.

According to a advantageous embodiment said dichroic beam splitting device comprises a first surface being adapted and/or arranged for having light of said first partial image entered said dichroic beam splitting device, in particular in said first or s-polarized polarization state.

Additionally or alternatively said dichroic beam splitting device comprises a second surface being adapted and/or arranged for having said light of said second and third partial images entered said dichroic beam splitting device. Further, said dichroic beam splitting device may comprise a third surface which is adapted and/or arranged for having said light of said first, second and third partial images left said dichroic beam splitting device.

Preferably, said dichroic beam splitting device may comprise a spectral selective interface being adapted and/or arranged: to essentially transmit light of said second and third partial images from said second surface of said dichroic beam splitting device to said third surface of said dichroic beam splitting device and/or to essentially reflect light of said first partial image from said first surface of said dichroic beam splitting device to said third surface of said dichroic beam splitting device.

Alternatively, said dichroic beam spitting device may comprise a spectral selective interface which is adapted and/or arranged to essentially reflect light of said second and third partial images from said second surface of said dichroic beam splitting device to said third surface of said dichroic beam splitting device and/or to essentially transmit light of said first partial image from said first surface of said dichroic beam splitting device to said third surface of said dichroic beam splitting device.

It is of further advantage if said first polarization selective or polarizing beam splitting device and said dichroic beam splitting device are adapted and/or arranged that said third surface of said first polarization selective or polarizing beam splitting device and said first surface of said dichroic beam splitting device essentially face each other.

Advantageously, a half-wave retarder device is provided—in particular between said third surface of said first polarization selective or polarizing beam splitting device and said first surface of said dichroic beam splitting device—for changing the polarizing state of said light of said first partial image exiting said first polarization selective or polarizing beam splitting device from said second or p-polarized polarization state to said first or s-polarized polarization state before entering said dichroic beam splitting device via said first surface thereof.

Alternatively, a half-wave retarder device is provided between said second surface of said second polarization selective or polarizing beam splitting device and said second surface of said dichroic beam splitting device for changing the polarization state of said light of said second partial image from a p- to a s-polarization and of said third partial images from a s- to a p-polarization.

Further advantageously, said second polarization selective or polarizing beam splitting device and said dichroic beam splitting device are adapted and/or arranged that said second surface of said second polarization selective or polarizing beam splitting device and said second surface of said dichroic beam splitting device essentially face each other.

According to a further embodiment said polarization selective interface of said first polarization selective or polarizing beam splitting device and said second polarization selective or polarizing beam splitting device, respectively, and/or said dichroic or spectral selective interface of said dichroic beam splitting device are adapted and/or arranged to essentially show a 45°-configuration and/or -geometry.

According to another embodiment said polarization selective interface of said first polarization selective or polarizing beam splitting device and said second polarization selective or polarizing beam splitting device and/or said dichroic or spectral selective interface of said dichroic beam splitting device may be adapted and/or arranged to essentially show a non-45°-configuration and/or -geometry, in particular essentially a 50°-configuration and/or -geometry.

According to another preferred embodiment said first spectral splitting and/or illumination part comprises a spectral splitting unit—in particular dichroic mirror and polarizing beam splitter(s)—being adapted: to split up said received and/or generated essentially white light into said first spectral component on the one hand and said second spectral component—in particular said third and fourth spectral components—on the other hand, and in particular—to redirect said first spectral component to said first surface of said first polarization selective or polarizing beam splitting device and said second spectral component to said first surface of said second polarization selective or polarizing beam splitting device and to change the polarization state of the fourth spectral component, in particular from a s-polarization to a p-polarization.

It is preferred that said first, second, and/or third image generating means are reflective liquid crystal display devices, liquid-crystal-on-silicon devices, LCoS devices and/or the like.

In the inventive imaging unit said first spectral selective splitting and/or illumination part (SSP1) may preferably be adapted:
- for splitting up said essential white light—in particular of a first or s-polarized polarization state—into said fourth spectral component and a fifth spectral component which is essentially complementary to said fourth spectral component with respect to said essentially white light,
- for changing the polarization state of the fourth spectral component into an orthogonal polarization state—in particular from s-polarized polarization state to p-polarized polarization state,
- for splitting up said fifth spectral component into the first and third spectral component which are essentially complementary to each other with respect to said fifth spectral component, and
- for recombining the third spectral component and the fourth spectral component in a coincident manner into the second spectral component.

In the inventive imaging unit said first spectral selective splitting and/or illumination part may comprise:
- a first dichroic mirror to split up said essential white light into said fourth spectral component and said fifth spectral component which are essentially complementary to each other with respect to said white light,
- a second dichroic mirror to split up said fifth spectral component into said first spectral component and said third spectral component which are essentially complementary to each other with respect to said fifth spectral component, and
- a polarizing beam splitter to recombine said fourth spectral component and said third spectral component in a coincident and/or parallel manner to said second spectral component.

In the inventive imaging unit said first spectral selective splitting and/or illumination part may comprise:
- a first dichroic mirror to split up said essential white light into said fourth spectral component and said fifth spectral component which are essentially complementary to each other with respect to said white light,
- a second dichroic mirror to split up said fifth spectral component into said first spectral component and said third spectral component which are essentially complementary to each other with respect to said fifth spectral component,
- a third dichroic mirror to recombine said fourth spectral component and said first spectral component in a coincident and/or parallel manner, and
- a first polarizing beam splitter to recombine said fourth spectral component and said third spectral component in a coincident and/or parallel manner and to split up said first spectral component.

According to a further preferred embodiment of the present invention said first spectral selective splitting and/or illumination part comprises a third dichroic mirror instead of said first polarizing beam splitter to recombine said fourth spectral component and said first spectral component in a coincident and/or parallel manner.

According to a further preferred embodiment of the present invention said first spectral selective splitting and/or illumination part comprises a half waver retarder to change the polarization state of the fourth spectral component—in particular from s-polarized polarization state to p-polarized polarization state.

According to a further preferred embodiment of the present invention said first spectral selective splitting and/or illumination part comprises at least one polarizing beam-splitter of glass-prism and/or McNeill type.

According to a further preferred embodiment of the present invention said first spectral selective splitting and/or illumination part comprises at least one polarizing beam-splitter of wire-grid type.

In the inventive imaging unit
- a wavelength selective polarizer may be provided, in particular between said second surface of said second polarization selective or polarizing beam splitting device and said dichroic beam splitting device:
- said wavelength selective polarizer may be adapted for transmitting the p-polarized part of said third spectral part,
- said wavelength selective polarizer may be adapted for transmitting the s-polarized part of said fourth spectral part, and
- said wavelength selective polarizer may be adapted for blocking the p-polarized part of said fourth spectral part.

In the inventive imaging unit
- said wavelength selective polarizer may comprise a cholesteric layer stacked between first and second quarter-wave retarders,
- said cholesteric layer may be adapted for essentially reflecting one circular polarized component of light in the wavelength range of the fourth spectral component and to transmit the complementary circular polarized component of light in the same wavelength range,
- said cholesteric layer may be adapted for essentially transmitting all light of any polarization state outside the wavelength range of the fourth spectral component,
- said first quarter-wave retarder may be adapted for essentially converting the incident linear polarized light into circular polarized light, and
- said second quarter-wave retarder may be adapted for essentially converting the outgoing circular polarized into linear polarized light.

According to a further preferred embodiment of the inventive imaging unit each of said quarter wave retarders may comprise two or more single wavelength quarter-wave retarders being adapted to convert linear polarized light into circular polarized light in a broad wavelength range.

According to a further preferred embodiment of the inventive imaging unit said wavelength selective polarizer may be an absorbing and wavelength selective polarizer, which is polarizing essentially within the wavelength range of the fourth spectral component and essentially non-polarizing outside this wavelength range.

According to a further preferred embodiment of the inventive imaging unit
> said wavelength selective polarizer may comprise a wavelength selective retarder and an absorbing polarizer, the wavelength selective retarder facing said second surface of said second polarization selective or polarizing beam splitting device and said absorbing polarizer facing said dichroic beam splitting device,
> said wavelength selective retarder may be adapted for either changing the polarization state of light inside the wavelength range of the fourth spectral component to an orthogonal polarization state and to keep the polarization state outside the wavelength range of the fourth spectral component essentially unchanged, the absorbing polarizer then being adapted for absorbing s-polarized light and transmitting p-polarized light, or
> said wavelength selective retarder may be adapted for changing the polarization state of light outside the wavelength range of the fourth spectral component to an orthogonal polarization state and to keep the polarization state inside the wavelength range of the fourth spectral component essentially unchanged, the absorbing polarizer then being tially unchanged, the absorbing polarizer then being adapted for absorbing p-polarized light and transmitting s-polarized light.

It is further preferred that only two polarization selective or sensitive surfaces and only one spectral selective or sensitive surface are necessary and are involved for splitting and recombining said respective spectral components and/or said partial images, respectively, in particular with a first polarization selective surface for splitting said second spectral component into third and fourth spectral component and to recombine said third and second partial images to a combined partial image, with one spectral selective surface to recombine said combined partial image with said first partial image to said recombined image representative for said image, and with a second polarization selective surface for reflecting said first spectral component and for transmitting said first partial image to said spectral selective surface.

These and further aspects of the inventive imaging units are further explained in the following:

Projection systems with three imager devices for each primary colour red, green and blue, respectively, need to split white illumination light into it's primary colours in order to illuminate each imager device separately with the respective colour. The light is recombined after being reflected or transmitted on the imager panel and then projected onto the screen. In case of reflective imager devices, beam-splitter cubes in various configurations are used to split and recombine the light.

The contrast of a projection system—defined as the ratio between the luminous flux in the full bright state and the luminous flux in the full dark state—is a key criterion describing the quality of a projector. In order to achieve a high contrast, the luminous flux in the dark state needs to be minimized. In optical engines with reflective imager devices the beam splitters not only recombine the primary colours, but also separate the light of the dark state from light of the bright state. Therefore, the contrast of an optical engine depends strongly from the style of the beam splitters and the beam splitter configuration.

The present invention inter alia suggests an optical engine using liquid crystal on silicon or LCoS panels as imager devices. In general, it comprises an illumination part and a beam splitter/recombination part. The illumination part e.g. splits the white light into a green and a magenta i.e. combined red and blue path as being a complementary combination green with respect to white. The splitter/recombination part e.g. comprises two polarising beam splitter or PBS and one dichroic beam splitter or DBS. The DBS splits magenta into blue and red.

Several different beam splitter configurations to be used in projection engines with 3 reflective LCoS or liquid crystal on silicon panels are known.

One known beam splitter configuration comprises two polarizing beam splitters (PBS) and one dichroic beam splitter and two additional wavelength selective polarization rotators. Alternatively, one PBS can be replaced by a glass cube of same size and material. This configuration is commonly known as a "ColorCorner". White light is entering the beam splitter system at one single surface and is split inside the system into it's primary components red, green and blue (R, G, B).

Another known beam splitter configuration comprises four PBS and four wavelength selective polarization rotators. This arrangement is commonly known as a "ColorQuad". Exactly as with the "ColorCorner" the white light is entering the beam splitter system at one single surface.

Also known is the so called "3-PBS" system, in which each of the three LCoS panels is assigned with one PBS. The three different light paths for each of the primary colours red R, green G and blue B, respectively, are recombined within an X-Cube. Said X-Cube comprises four right-angle prisms, glued together with their perpendicular faces to form a cube. The perpendicular faces are coated with a dichroic multi-layer. White light is split into three channels of primary colours before entering the beam-splitter block.

Another, quite different, approach is the "Philips Prism". Here the beam-splitters are not of 45°/90° type and the principle makes use of total internal reflection.

The present invention inter alia describes a solution for an optical engine of a three panel LCoS projector, without the need of wavelength selective polarization rotators and in particular use of only two polarizing beam splitter cubes or PBSs and one dichroic beam splitter cube or DBS.

The known "3 PBS" configuration uses three polarizing beam splitter cubes or PBSs and additionally one costly colour recombination cube. As an additional drawback the light must be split into all 3 primary colours before entering the beam-splitter block. This requires two additional dichroic mirrors and additional lenses in the illumination path.

In order to overcome the requirement of pre-splitting the light into it's primary colours before entering the polarizing beam-splitter block, systems like the known "ColorCorner" from Unaxis AG or the known "ColorQuad" from ColorLink inc., are splitting the white light inside the polarizing beam splitter block. But in order to do this, they need wavelength selective polarization rotators. Wavelength selective polarization rotators comprise a stack of up to 10 or more birefringent retarder foils. They rotate the polarization state of one primary colour while the polarization state of the complementary colour remains unchanged. Beside the drawback of cost, the wavelength selective polarization rotators are dependent on temperature, causing colour non-uniformity in the displayed image. Also both the "ColorCorner" and "ColorQuad" configuration have at least one imager panel in a position, where the light of the black state is blocked in the unfavourable P-polarization mode. Polarizing beam splitter cubes or PBSs have a good blocking characteristic only for S-polarized light, while P-polarized light leaks with a significant amount. This reduces the contrast of the system. An additional wavelength selective polarization rotator and a cleanup polarizer is needed at the exit of both configurations to absorb ("clean up") this leaked light and to keep the contrast reasonably high.

The invention therefore realizes an optical engine with e.g. three reflective liquid crystal panels or LCoSs using only two polarizing beam splitter cubes and one dichroic beam splitter cube.

In contrast to some other existing designs of optical engines, like the "ColorQuad" and "ColorCorner" design, this invention doesn't need wavelength selective polarization rotators. Beside the drawback of additional cost, the wavelength selective polarization rotators are dependent on temperature, causing colour non-uniformity in the displayed image. Also both the "Color-Corner" and "ColorQuad" configuration have at least one LCoS in a position, where the light of the black state is blocked in the unfavourable p-polarization mode.

BRIEF DESCRIPTION OF DRAWINGS

The present invention will become more elucidated based on the following description and taken into account the accompanying Figures.

FIG. 2A-3B are cross-sectional top views of second spectral splitting and/or recombination parts which may be involved in preferred embodiments of the present invention.

FIGS. 8A, 8B are cross-sectional top views elucidating details of further embodiments of second spectral splitting and/or recombination parts which may involved in preferred embodiments of the present invention.

DETAILED DESCRIPTION

In the following elements and components having similar structures and similar functionalities with respect to each other are indicated by the same reference symbols and their description is not in each case of their occurrence repeated.

In the following first embodiments of the present invention will be elucidated by taking reference to FIGS. 1 to 5. In these embodiments said first, third, and fourth spectral components g, r, and b, respectively, may for instance but not necessarily refer to green, red, and blue light, respectively. Therefore, said second spectral component m as a spectral superposition of said third and fourth spectral components r and b, respectively, refers in this example to magenta m=r+b.

Figure 1:
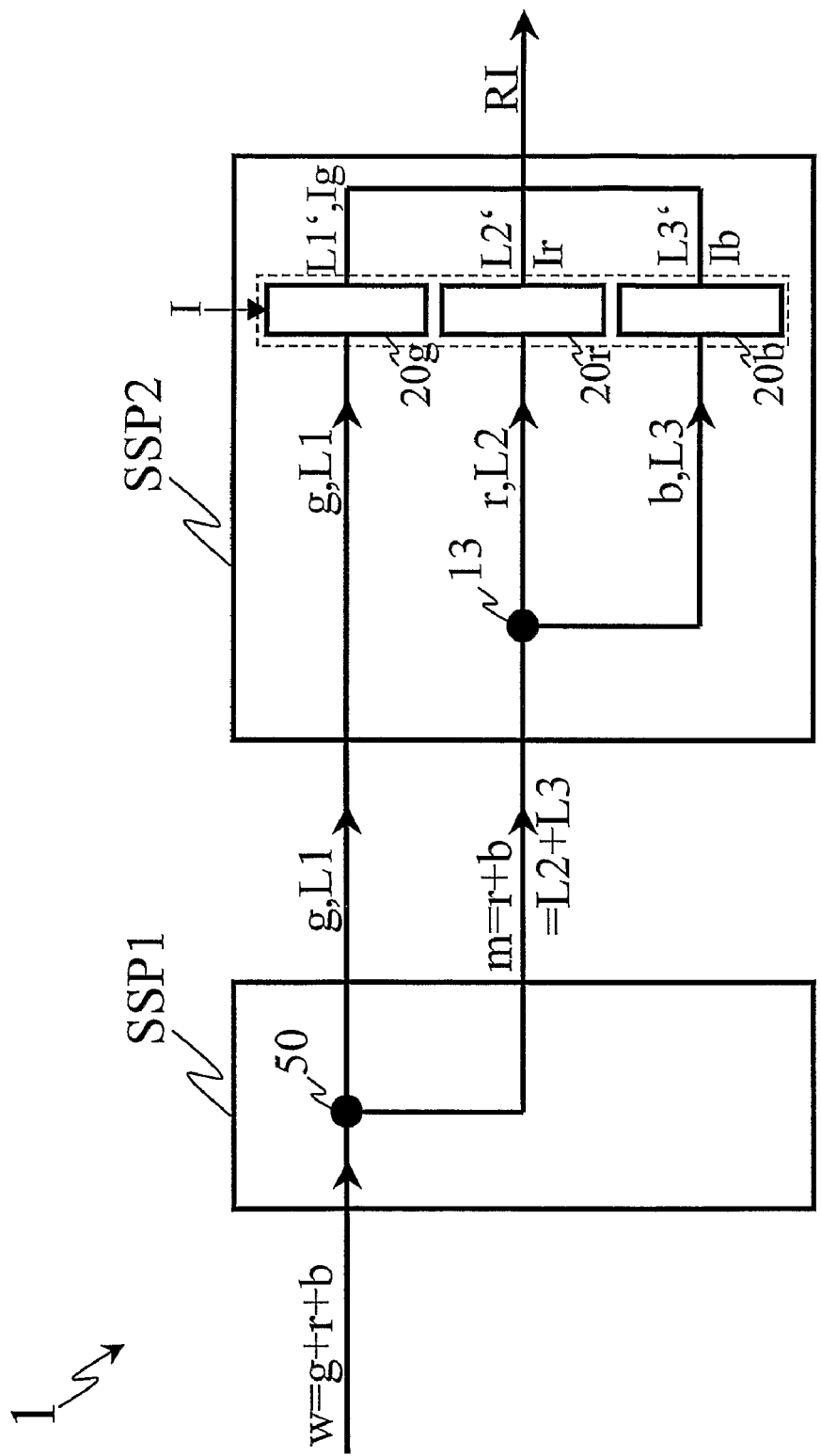
FIG. 1 is a schematical block diagram elucidating the working principle of one embodiment of the present invention.

FIG. 1 elucidates by means of a schematical block diagram the basic working principles of one embodiment of the present invention. The inventive imaging unit 1 shown in FIG. 1 is constituted by a first spectral splitting and/or illumination part SSP1 and a second spectral splitting and/or recombination part SSP2. In the embodiment shown in FIG. 1 said first spectral splitting and/or illumination part SSP1 receives essentially white light w from an external light source, which is not shown in FIG. 1. By means of a dichroic or spectral selective system 50 said received essentially white light w is split up into a first spectral component g and a second spectral component m, the latter of which may be referred to as a superposition of third and fourth spectral components r, b, respectively, to be described later. In the case of FIG. 1 said essentially white light w is split up into green light g and light having the color magenta as a superposition of red and blue. Said first and second spectral components g and m are supplied to said second spectral splitting and/or recombination part SSP2. By involving a first image generating means 20g a first partial image Ig with an respective amount of light L1' is generated. By using a dichroic beam splitting device 13 said second spectral splitting and/or recombination part SSP2 produces separated third and fourth spectral components r or L2 and b or L3, respectively. In the case of FIG. 1 said third and fourth spectral components are complementary with respect to each other and with respect to said second spectral component m, and they can be identified with the colors red and blue. Said third and fourth spectral components r and b are supplied to second and third image generating means 20r and 20b so as to generate second and third partial images Ir and Ib having respective amounts of light L2' and L3', respectively. By recombining the light L1' and L2' and L3' from said first, second and third partial images Ig, Ir, and Ib, respectively, a recombined image RI is obtained which is representative for the image I to be generated and/or to be reproduced.

Figure 2B:
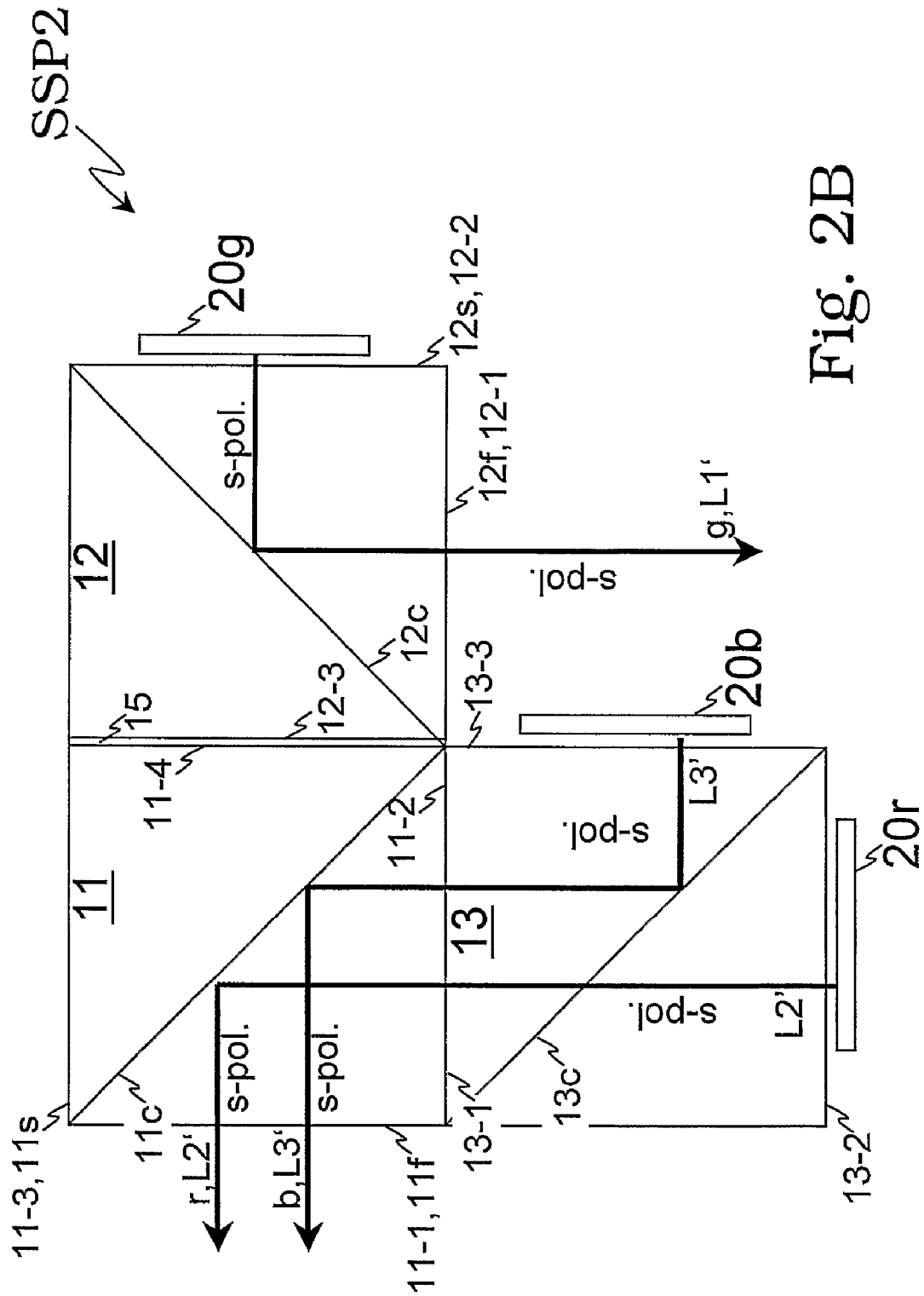

Some basic working principles are described in FIGS. 2A and 2B. White light w is pre-split into one first spectral component g or primary colour g, preferably green g, and a complementary second spectral component m or complementary colour m, preferably magenta m, as a superposition of red r and blue b: m=r+b. The splitting mechanism is not shown in FIGS. 2A and 2B.

In FIG. 2A, green and s-polarized light L1 or g is entering the first polarizing beam splitter PBS 12 at the first surface 12f, 12-1 thereof, and is redirected by the polarizing beam splitter coating 12c or polarization selective interface 12c in direction to the reflective panel or LCoS as a first image generating means 20g for a first partial Image Ig.

In the bright-state the panel 20g changes the polarization direction of the reflected light L1' into p-polarized light which now is transmitting said first polarizing beam splitter 12 and its polarizing beam splitter coating 12c in an direction towards the second polarizing beam splitter device 11. Passing the half-wave retarder sheet 15, the polarization state of the light L1' of the first partial Image Ig is turned from the p- to the s-polarized state and is then redirected at the second polarizing beam splitting device 11 and its polarizing beam splitter coating 11c in a direction towards the projection lens 100.

In FIG. 2A, s-polarized red and blue light, L2 or r and L3 or b respectively, is entering said second polarizing beam splitter device or cube 11 at its first surface or face 11f, 11-1. It is redirected at the polarization selective interface 11c or polarizing beam splitter coating 11c in a direction towards the dichroic beam splitter device or cube 13. At the dichroic beam splitter coating 13c of the dichrois beam splitter device 13 one light beam, here the blue light L3, b, is redirected in a direction towards a reflective panel 20b or third image generating means 20b. The other light beam, here the red light L2, r, is transmitting the dichroic beam splitter coating 13c in a direction towards a second LCoS panel 20r or second image generating means 20r.

The red light L2, r and blue light L3, b are reflected at the panels 20r and 20b, respectively, thereby second and third partial images Ir, Ib are generated. In the bright state, the polarization states of the reflected red light L2', r and the reflected blue light L3', b are turned into a p-polarized polarization state. The reflected red light L2', r is transmitting the dichroic beam splitter coating 13c and the polarizing beam splitter coating 11c and is leaving the polarizing beam splitter 11 at the third surface or face 11s, 11-3 and entering the projection optics or lens 100. The reflected blue light L3' is redirected at the dichroic beam splitter coating 13c, is transmitting the polarizing beam splitter coating 11c and leaving the polarizing beam splitter 11 also at its third surface or face 11s, 11-3 and entering the projection lens 100.

For the dark state FIG. 2B demonstrates that the reflected green light L1', g remains in a s-polarized state and is redirected into a direction towards the first surface or face 12f, 12-1, where it is leaving the first polarizing beam splitter 12.

The reflected red light L2', r remains in its s-polarized state, is transmitting the dichroic beam splitter coating 13c and is redirected at the polarizing beam splitter coating in a direction towards the first surface or face 11f, 11-1, where it is leaving the second polarizing beam splitter 11.

The reflected blue light L3', b also remains in its s-polarized state. L3', b is redirected at the dichroic beam splitter coating 13c in a direction toward the second polarizing beam splitter cube 11 and is again redirected at the polarizing beam splitter coating 11c in a direction towards the first surface or face 11f, 11-1 where it is leaving the second polarizing beam splitter cube 11.

The dichroic beam-splitter cube 13 is preferably not in a 45° configuration, but in approx. 50° configuration. This configuration is shown in FIG. 3A and has the advantages. First, at higher angles of incidence the dichroic beam splitter coating has better quality. Secondly, the oblique surface 13t fits to the angle of the incoming convergent light L1, g, allowing a more compact design.

Figure 3B:
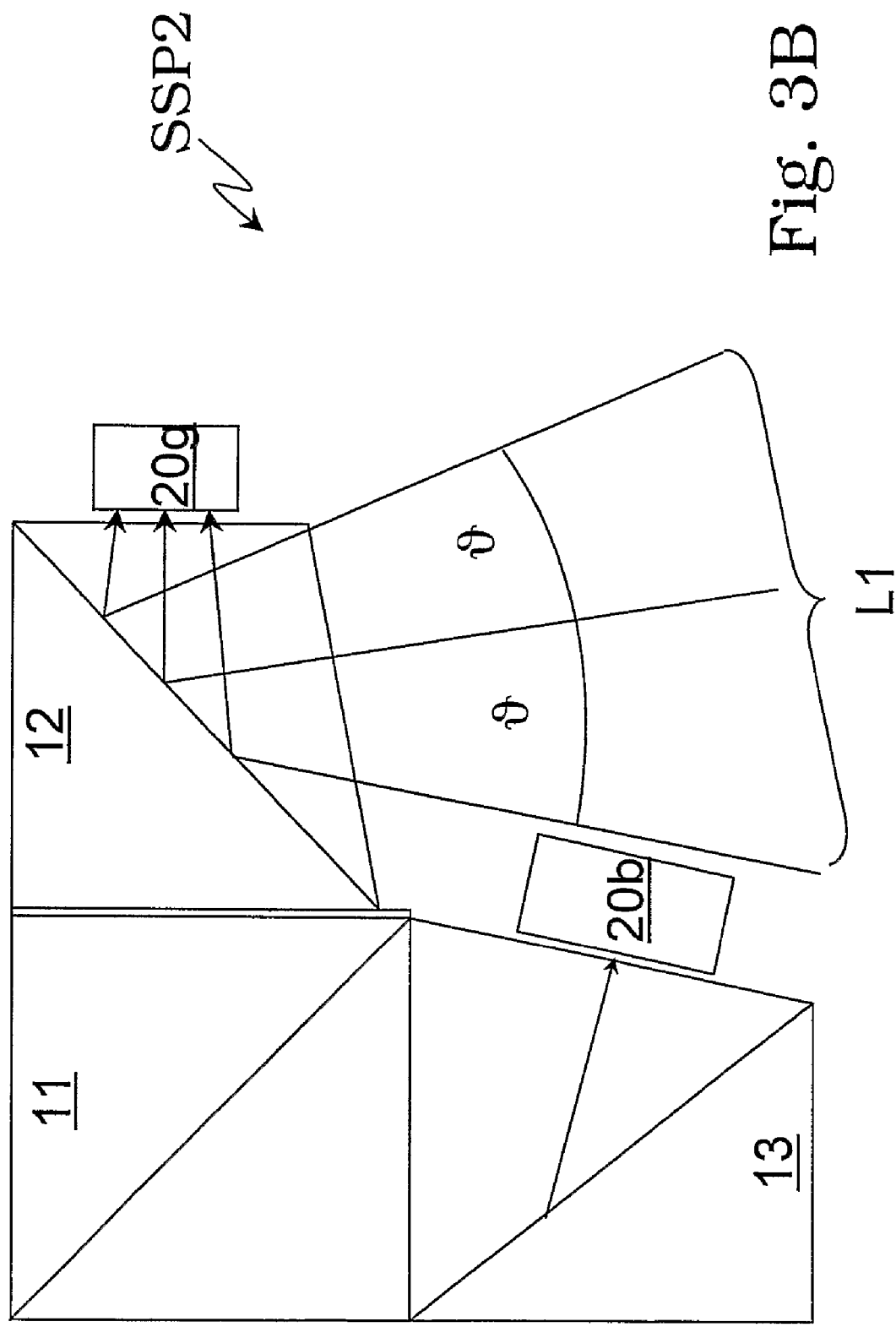

FIG. 3B shows an embodiment where the first polarizing beam splitter 12 has oblique angles. This allows an higher aperture of the incoming light beam L1, g.

Figures 4A, 4B:
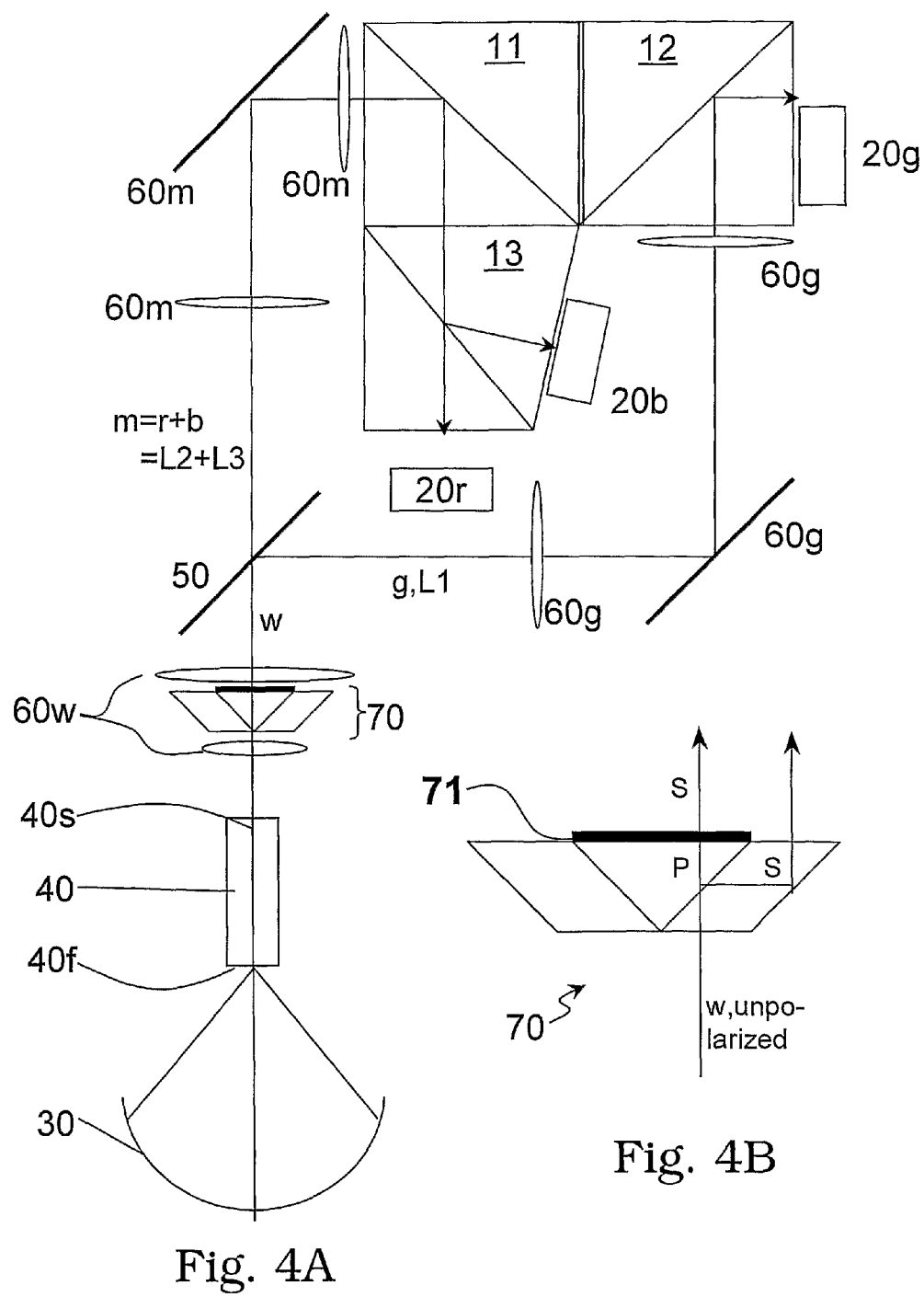
FIG. 4A is a cross-sectional top view of an embodiment of the inventive imaging unit.
FIG. 4B is a cross-sectional top view of a polarization conversion system which may be involved in the present invention.

FIG. 4A shows an embodiment of the pre-splitting illumination optic, i.e. the first spectral splitting and/or illumination part SSP1 according to the present invention, which e.g. uses an elliptical reflector 30 with a light-pipe 40. Light is coupled from said elliptical reflector 30 into the entrance 40f of said light-pipe 40. The light is multiply reflected inside the light-pipe 40 and is the uniformly distributed at the exit 40s. The exit 40s has a rectangular shape, in particular with same aspect ratio as the LCoS panels 20r, 20g, 20b for the partial images Ig, Ir, Ib. By means of a system of lenses and folding mirrors 60w, 60m and 60g, the exit 40s of the light-pipe 40 is imaged onto the LCoS panels 20r, 20b and 20g or first, second and third image generating means 20r, 20b and 20g, respectively.

A dichroic mirror 50 splits the white light w into a green wavelength region L1, g, which is reflected or transmitted into the green channel and a wavelength region in red L2, r and blue L3, b which is transmitted (or reflected) into the magenta channel. The dichroic mirror 50 comprises a multilayer band-pass filter.

A polarization converting system or PCS 70 is used in order to polarize the light. The PCS splits s- and p-polarization, the s-polarization is redirected to the outer prisms, whereas the p-polarization is transmitting the prism and turned into s-polarization when passing the half-wave retarder 71, as shown in FIG. 4B. Consequently all light w coming from the PCS is s-polarized.

Figure 5:
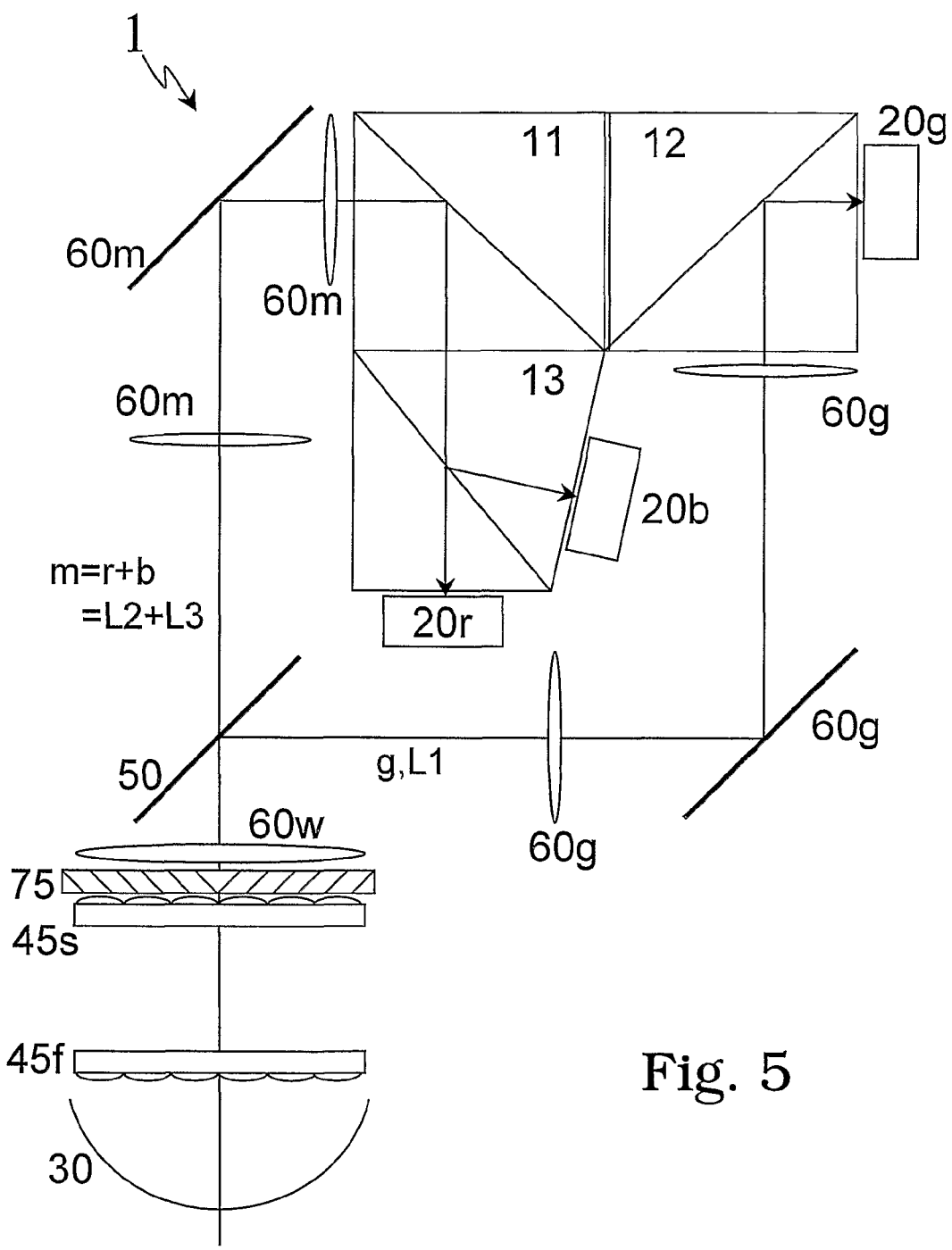
FIG. 5 is a cross-sectional top view of a further preferred embodiment of the present invention.

Another embodiment of the illumination optic using a parabolic reflector 30 and fly-eye integrators 45f, 45s is shown in FIG. 5. Here, instead of a light-pipe, fly-eye integrators 45f, 45s are used to illuminate the LCoS panels uniformly and with rectangular shape. A polarization converting system or PCS 75 polarizes the light into s-polarization.

In the following further embodiments of the present invention will be elucidated by taking reference to FIGS. 6 to 9. In these embodiments said first, third, and fourth spectral components r', g', and b', respectively, may for instance but not necessarily refer to red, green, and blue light, respectively. Therefore, said second spectral component c' as a spectral superposition of said third and fourth spectral components g' and b', respectively, refers in this example to the colour cyan c'=g'+b'.

Figure 6:
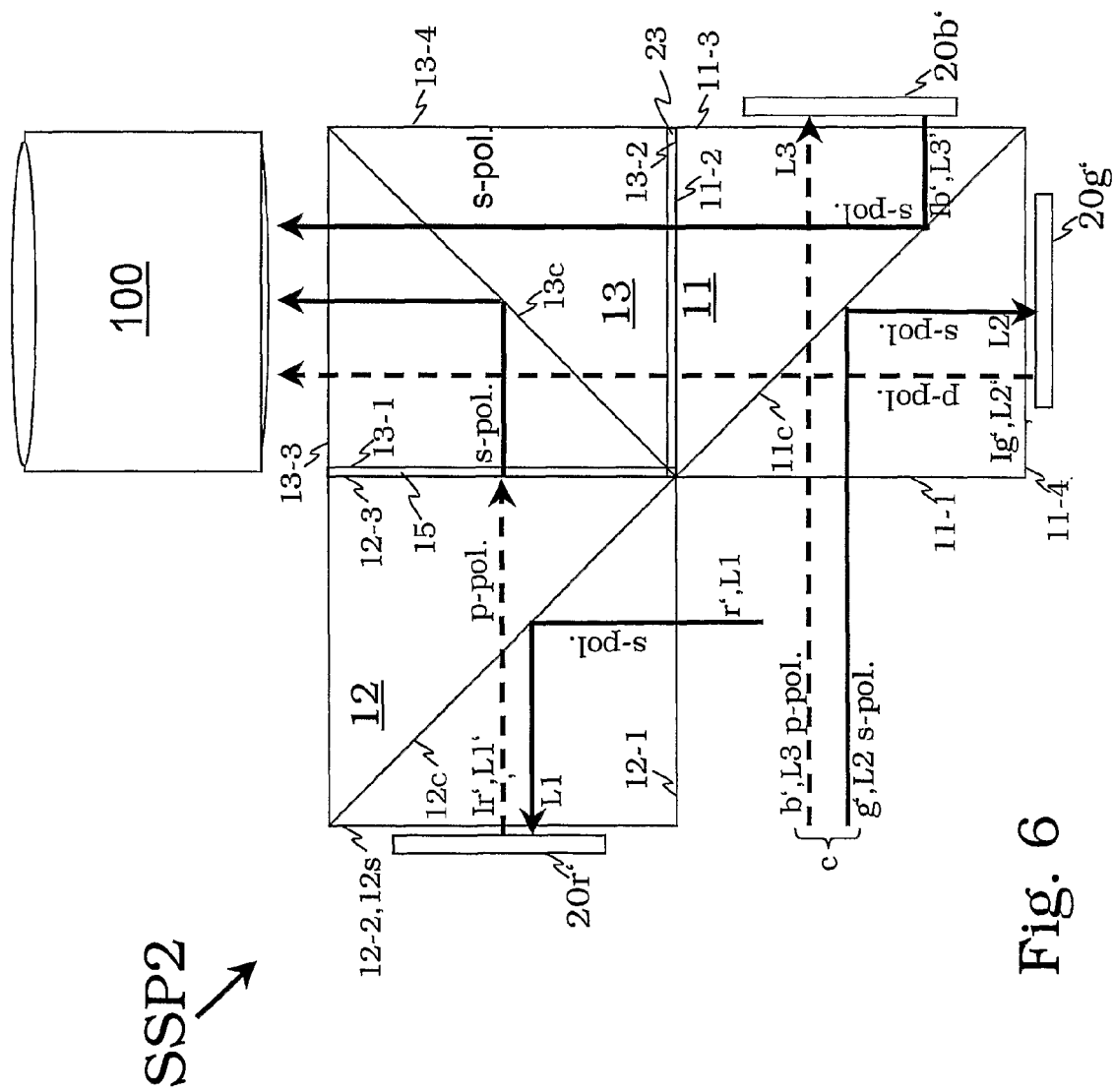
FIG. 6 is a cross-sectional top view of another second spectral splitting and/or recombination part which may be involved in a preferred embodiment of the present invention.

FIG. 6 is a cross-sectional top view of a further second spectral splitting and/or recombination part which may be involved in preferred embodiments of the invention. In this case within a pre-splitting process taking place in a respective first splitting and/or illumination part, white light w is separated or split-up into light L1 of a first spectral component r, which may for example correspond to red light and which may have in the example of FIG. 6 a first or s-polarized polarization state. Additionally, from said white light w light L2 and L3 of or for a second spectral component c' is separated or split-up. Said second spectral component c' of the embodiment shown in FIG. 6 is essentially a spectral complement to said first spectral component r' with respect to said given white light w. For instance, said second spectral component c' may be built up by a combination of a third spectral component g', for instance, but not limited to green light g', and a fourth spectral component b', for instance, but not limited to blue light b'.

As can be seen from the cross-sectional view of FIG. 6, this embodiment for a second spectral splitting and/or recombination part SSP2 also comprises first and second polarization selective or polarizing beam splitting devices 12 and 11, respectively, as well as a dichroic beam splitting device 13.

However, the arrangement shown in FIG. 6 strongly defers from the embodiments shown in FIGS. 2A to 4A and 5. In the former embodiments the partial images Ir, Ig, Ib are combined within said second polarization selective or polarizing beam splitting device 11 to enable said images Ir, Ig, Ib to leave said second polarizing selective or polarizing beam splitting device 11 via its third surface 11-3 in order to have these images Ir, Ig, Ib entered certain projection optics 100 to form a recombined image RI to be representative to an image I to be displayed. In contrast, this functionality of combining and unifying the partial images Ir', Ig', Ib' in accordance with the embodiment shown in FIG. 6 is realized by said dichroic beam splitting device 13.

Figure 11:
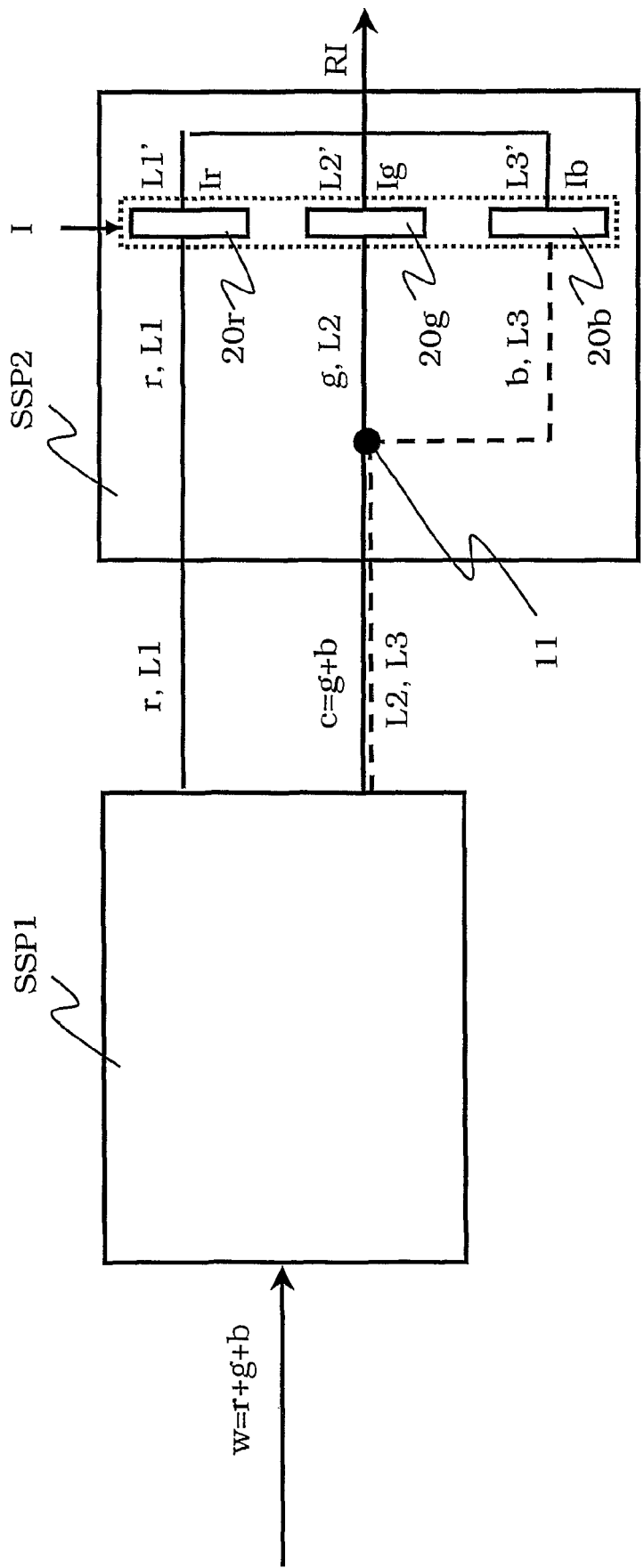
FIG. 11 is a schematical block diagram elucidating the working principle of one embodiment of the present invention.

This is described in detail in the following below:

FIG. 11 elucidates by means of schematic block diagrams the basic working principles of another embodiments of this invention also taking reference to FIGS. 6 and 7.

The inventive imaging unit shown in FIG. 11 is constituted by a first spectral splitting unit and/or illumination part SSP1 and a second spectral splitting and/or recombination part SSP2. In the embodiment shown in FIG. 11 said first spectral splitting unit and/or illumination part SSP1 receives essentially white light w from an external light source, which is not shown in FIG. 11. The received white light is linear polarized. Said essentially white light w is split into said first, third and fourth spectral components r', g' and b' respectively. The polarization state of the fourth spectral component is changed to an orthogonal polarization state—in particular from said first or s-polarized to said second or p-polarized polarization state. Said third spectral component g' or L2 and said fourth spectral component b' or L3 are recombined in a coincident or parallel manner to said second spectral component c' and are leaving the first spectral splitting unit and/or illumination part SSP1 in a non-coincident or non-parallel manner with respect to the first spectral component r' or L1. Said spectral components r' and c' are complementary to each other with respect to said essentially white light w, and they may for instance but not necessarily refer to red and cyan.

Said first and second spectral components r' and c' are supplied to said second spectral splitting and/or recombination part SSP2. Said first spectral component r' is supplied to a first image generating means 20r so as to generate a first partial image Ir having the amount of light L1'. By using a polarizing beam splitting device 11 said second spectral splitting and/or recombination part SSP2 produces separated third and fourth spectral components g' or L2 and b' or L3, respectively. Said third and fourth spectral components are complementary to each other and with respect to said second spectral component c', and they may for instance but not necessarily refer to green and blue. Said third and fourth spectral components g' and b' are supplied to second and third image generating means 20g and 20b so as to generate second and third partial images Ig and Ib having respective amounts of light L2' and L3', respectively. By recombining the light L1' and L2' and L3' from said first, second and third partial images Ir, Ig and Ib, respectively, a recombined image RI is obtained which is representative for the image I to be generated and/or to be reproduced.

The first polarization selective or polarizing beam splitting device 12 comprises first, second, third, and fourth surfaces 12-1, 12-2, 12-3, 12-4, respectively. Light L1 of said received first spectral component r' enters said first polarization selective or polarizing beam splitting device 12 via said first surface 12-1. Due to its s-polarized polarization state, said light L1 of said first spectral component r' is reflected at the polarization selective interface 12c of said first polarization selective or polarizing beam splitting device 12 and forced to leave said first polarization selective or polarizing beam splitting device through its second surface 12-2 in order to interact with a first image generating device 20r' which is for instance an image generation means for a first partial image Ir' in red.

Upon interaction with said first image generation means 20r' light L1' of said first partial image Ir' of a p-polarized polarization state and waste light L2" of a negative of said first partial image Ir' of a s-polarized polarization state is generated and forced to re-enter said first polarization selective or polarizing beam splitting device 12 through its second surface 12-2. According to its p-polarized polarization state, said light L1' of said first partial image Ir' is transmitted by said polarization selective interface 12c of said first polarization selective or polarizing beam splitting device 12 in order to leave said first polarization selective or polarizing beam splitting device 12 through its third surface 12-3. Optional after leaving said first polarizing selective or polarizing beam splitting device 12, said light L1' of said first partial image Ir' enters a provided half-wave retarder 15 where the polarization state of said light L1' is changed to a s-polarized polarization state.

As the third surface 12-3 of said first polarization selective or polarizing beam splitting device 12 is arranged to essentially face or oppose a first surface 13-1 of the provided dichroic beam splitting device 13, said light L1' of said first partial image Ir' enters said dichroic beam splitting device 13 and is then reflected at its spectral selective interface 13c so as to leave said dichroic beam splitting device 13 through the third surface 13-3 thereof in order to enter the respective projection optics 100.

Alternatively, said light L1' of said first partial image Ir' is transmitting the spectral selective interface 13c in order to leave said dichroic beam splitting device 13 through the fourth surface 13-4 thereof.

The embodiment of FIG. 6 also comprises a second polarization selective or polarizing beam splitting device 11 which has respective first, second, third and fourth surfaces 11-1, 11-2, 11-3, 11-4, respectively. Light L2 and L3 of said second spectral component c', i.e. of a combination of said third spectral component g' and said fourth spectral component b', for instance, green light and said blue light, respectively, enters said second polarization selective or polarizing beam splitting device 11 through its first surface 11-1. As said light L2 of said third spectral component g' is s-polarized, it is reflected at the polarization selective interface 11c of said second polarization selective or polarizing beam splitting device 11 in order to leave said second polarization selective or polarizing beam splitting device 11 through its fourth surface 11-4 so as to interact with a provided second image generating means 20g' for a respective second partial image Ig'.

Upon reflection of the generated light L2' for said second partial image Ig', its polarization state is changed to a p-polarized polarization state. Therefore, said light L2' of said second partial image Ig' after reentering said second polarization selective or polarizing beam splitting device 11 through its fourth surface 11-4 is transmitted at said polarization selective interface 11c of said second polarization selective or polarizing beam splitting device 11 in order to leave said second polarization selective or polarizing beam splitting device 11 through its second surface 11-2 in order to enter the dichroic beam splitting device 13 at the second surface 13-2 thereof. The generated light L2" for the negative of said second partial image Ig' is still s-polarized. Therefore, said light L2" for the negative of said second partial image Ig' is reflected at said polarization selective interface 11c of said second polarization selective or polarizing beam splitting device 11 in order to leave said second polarization selective or polarizing beam splitting device 11 through its first surface 11-1.

As the spectral selective interface 13c of said dichroic beam splitting device 13 is reflective only for said first spectral component r', said light L2' of said second partial image Ig' is transmitted at said spectral selective interface 13c of said dichroic beam splitting device 13 in order to leave said dichroic beam splitting device 13 through its third surface 13-3 in order to enter said provided projection optics 100.

Alternatively, the spectral selective interface 13c can be modified in order to reflect said light L2' of said second partial image Ig' in order to leave said dichroic beam splitting device 13 through its fourth surface 13-4.

Finally, said light L3 of said fourth spectral component b' is due to its p-polarized polarization state transmitted at said polarization selective interface 11c of said second polarization selective or polarizing beam splitting device 11 in order to leave said second polarization selective or polarizing beam splitting device 11 through its third surface 11-3 so as to interact with a provided third image generating means 20b' so as to have produced light L3' for said third partial image Ib' which re-enters said second polarization selective or polarizing beam splitting device 11 again through its third surface 11-3 and having a changed, i.e. a s-polarized polarization state according to which said light L3' for said third partial image Ib' is reflected at the polarization selective interface 11c of said second polarization selective or polarizing beam splitting device 11.

The generated waste light L3" which re-enters said second polarization selective or polarizing beam splitting device 11 is still p-polarized and is transmitting the polarization selective interface 11c of said second polarization selective or polarizing beam splitting device 11 in order to leave said second polarization selective or polarizing beam splitting device 11 through its first surface 11-1.

After reflection at said interface 11c said light L3' of said third partial image Ib' leaves said second polarization selective or polarizing beam splitting device through its second surface 11-2 in order to enter said dichroic beam splitting device 13 through its second surface 13-2 where it is transmitted by said spectral selective interface 13c thereof in order to leave said dichroic beam splitting device 13 through its third surface 13-3 and then enters said provided projection optics 11.

Alternatively, the spectral selective interface 13c can be modified in order to reflect said light L3' of said third partial image Ib' in order to leave said dichroic beam splitting device 13 through its fourth surface 13.4.

Figure 7A:
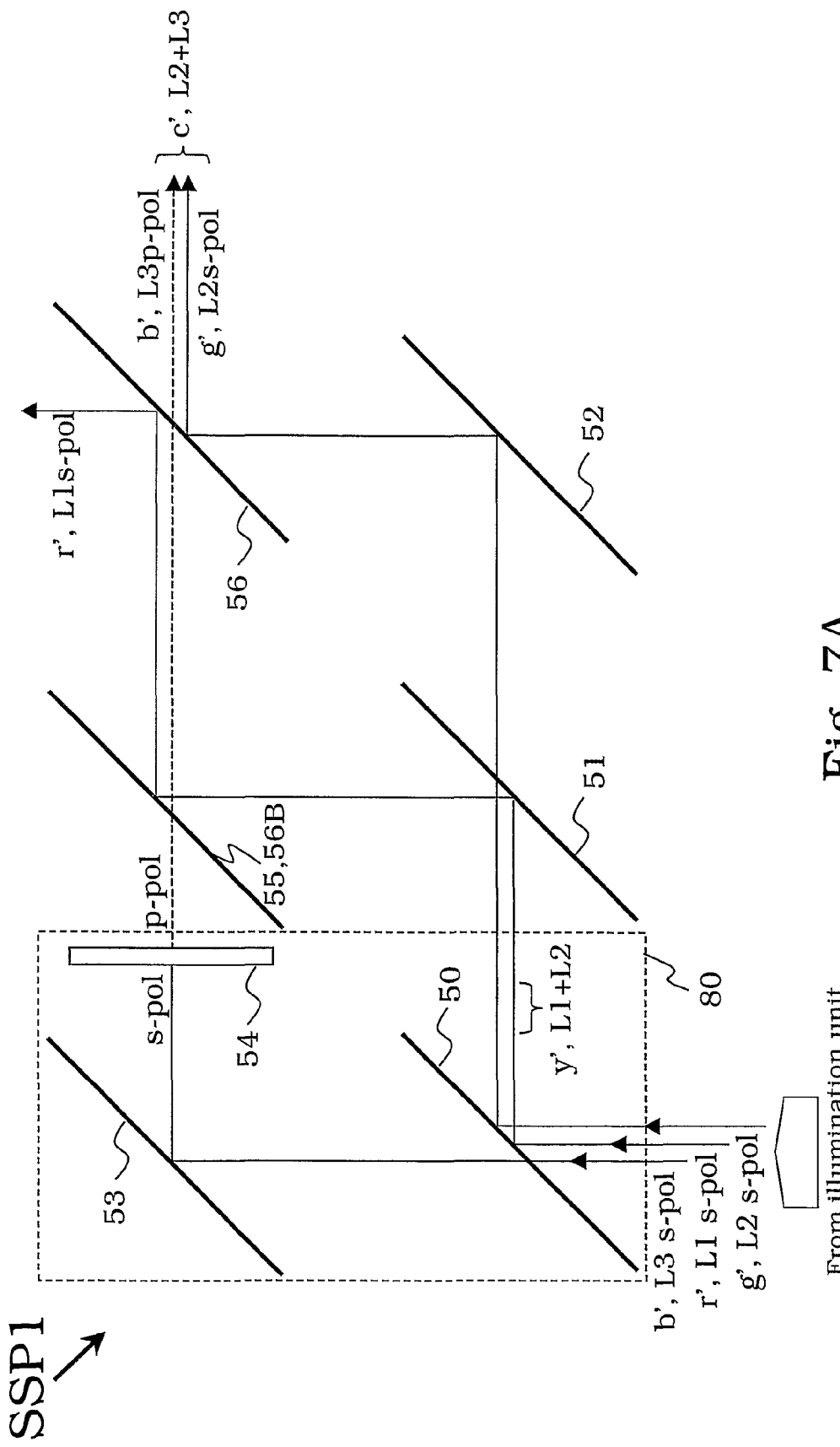
FIGS. 7A, 7B are cross-sectional top views of further embodiments of first spectral splitting and/or illumination parts which may be involved in the present invention.
Figure 7B:
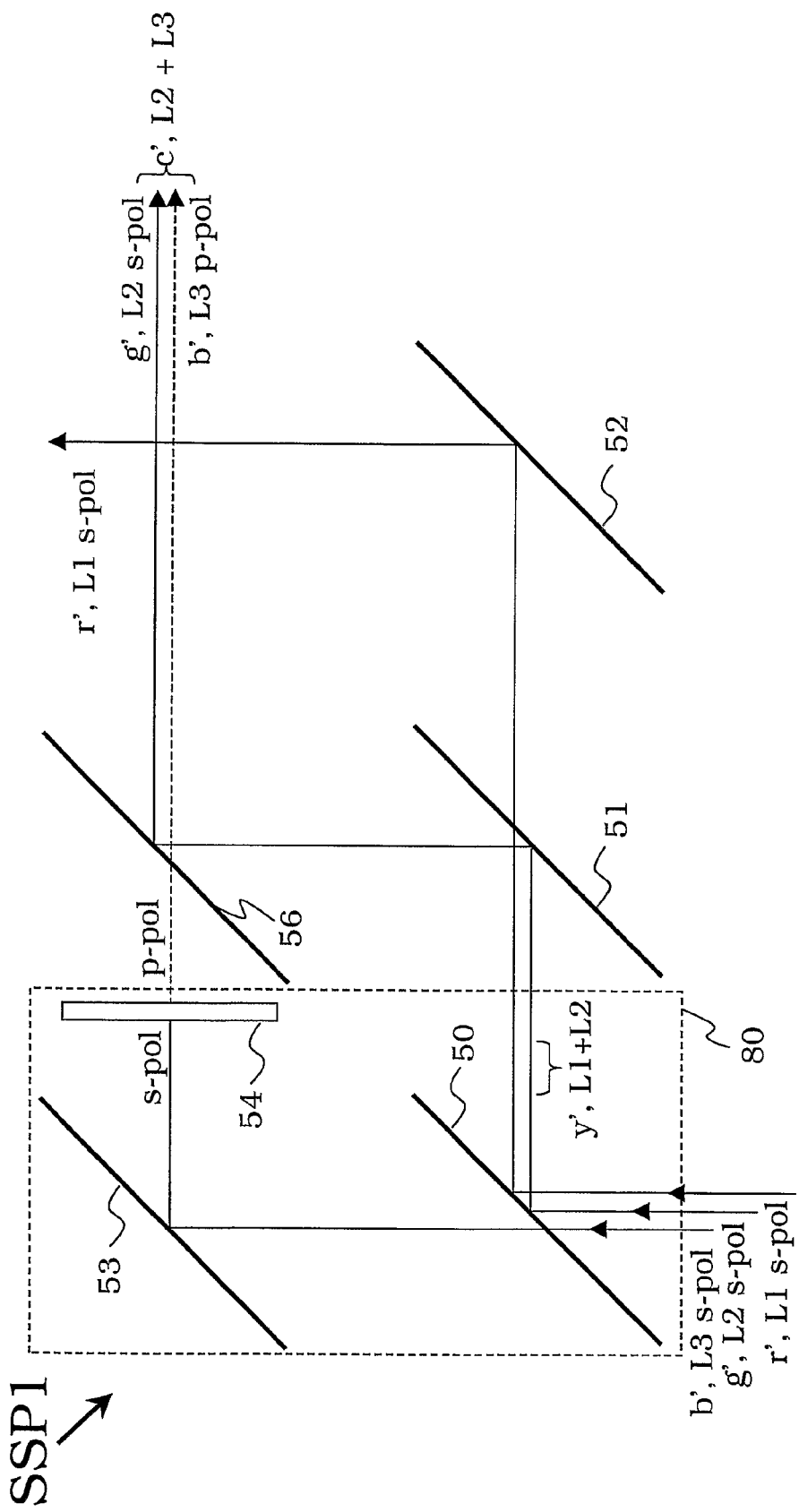

FIGS. 7A and 7B describe by means of cross-sectional top views different embodiments for first spectral splitting and/or illumination parts SSP1 which may be involved within different embodiments of the present invention.

All embodiments shown in FIGS. 7A and 7B involve a spectral selective splitting member 80 for receiving white light w comprising for instance said first, third, and fourth spectral components r', g' and b', respectively. As a result of the action of said spectral selective splitting member 80, said white light w is split-up or separated into said first and said third second components r' and g', in particular in a respective s-polarized polarization state, on the one hand, and said fourth spectral component b', in particular in a p-polarized polarization state, on the other hand. Said spectral selective splitting member 80 therefore comprises a first dichroic mirror 50 for performing the separation process with respect to said first and said third spectral components r' and g', on the one hand, and said fourth spectral component b' which is simply transmitted by said dichroic mirror 50, on the other hand. After transmission of said fourth spectral component b', the light L3 thereof is incident with respect to a folding mirror 53 and then upon reflection on said folding mirror 53 directed to a half-wave retarder 54 so as to change its polarization state from a s-polarized polarization state to a p-polarized polarization state. After interaction of said essentially white light w, there exists light L1 and L2 of said first and said third spectral component r' and g', respectively, in a superposed state having for instance a polarization s and light L3 of said fourth spectral component b' in separation from said first and said third spectral components r' and g', respectively, and having for instance a p-polarized polarization state.

The embodiments of FIGS. 7A and 7B defer from each other with respect to the provided means for further processing the three types of light L1 to L3 of said first, third and fourth spectral components r', g', b', respectively.

The embodiments of FIGS. 7A and 7B further comprise second and third dichroic mirrors 51 and 55 which are selective with respect to the first spectral component r'. Therefore, at the spectral selective interface of the second dichroic mirror 51, said first and said third spectral components r' and g' are separated from each other. Thereby, said third spectral component g' is transmitted, whereas said first spectral component r' is directed to said third dichroic mirror 55. The transmitted light L2 of said third spectral component g' is reflected after its transmission with respect to said second dichroic mirror 51 at the interface of a second folding mirror 52. The light L1 of said first spectral component r' is after reflection at said third dichroic mirror 55 directed to a polarization selective beam splitting device 56.

Alternatively, instead of a dichroic mirror 55 a polarizing beam splitter 56B can be used in order to reflect light L2 and in order to transmit light L3.

In the embodiment of FIG. 7A, said polarization selective beam splitting device is a wire-grid polarization beam splitter 56 which is arranged and/or adapted to reflect incident and s-polarized light L1 and L3 of said first and said third spectral components r' and g'. Thereby, said light L1 of said first spectral component r' is directed to the first surface 12-1 of said first polarization selective or polarizing beam splitting device 12 of the second spectral splitting and/or recombination part SSP2 shown in FIG. 6. After reflection on the interface of the wire-grid polarization beam splitter 56, the light L2 of said third spectral component g' is directed to the first interface 11-1 of said second polarization selective or polarizing beam splitting device 11 of the second spectral beam splitting and/or recombination part shown in FIG. 6.

The same functionality is realized by a polarizing beam splitter cube 57 as a polarization selective beam splitting device.

In FIG. 7A the p-polarized light L3 of said fourth spectral component b' is also incident to the polarization selective beam splitting device 56, 57 but is in accordance to its polarization state p directly transmitted to the first surface 11-1 of the second polarization selective or polarizing beam splitting device 11 of the embodiment of the second spectral splitting and/or recombination part shown in FIG. 6.

In contrast, the action of the second embodiment 7B is somewhat different. The second dichroic mirror 51 is reflective with respect to the third spectral component g', for instance with respect to green light. Therefore, said first spectral component r' is transmitted directly to the second folding mirror 52, whereas said third spectral component g' is reflected in the direction of the wire-grid polarizing beam splitter 56, which is selective with respect to the s-polarized polarization state. Because of its s-polarization, said light L2 of said third spectral component g' is reflected at the interface of said wire-grid polarizing beam splitter 56 in order to be directed to the first surface 11-1 of said second polarization selective or polarizing beam splitting device 11 of the second spectral splitting and/or recombination part shown in FIG. 6. Additionally, also light L3 of said fourth spectral component b' having a p-polarized polarization state is transmitted by said wire-grid polarizing beam splitter 56 when incident to its surface and transmitted directly also to said first surface 11-1 of said second polarization selective or polarizing beam splitting device 11 of the second spectral splitting and/or recombination part SSP2 shown in FIG. 6. Finally, upon incidence of the light L1 of said first spectral component r' at said second folding mirror 52 shown in FIG. 7B, said light L2 of said first spectral component r' is directed to said first surface 12-1 of said first polarization selective or polarizing beam splitting device 12 of the second spectral splitting and/or recombination part SSP2 shown in FIG. 6.

The same functionality can be realized by a polarizing beam cube instead of the wire grid polarizer.

FIGS. 8A and 8B illustrate a process of contrast enhancement with respect to the fourth spectral component b', and for instance with respect to blue light. The major parts shown in FIGS. 8A and 8B are taken from the embodiments shown in FIG. 6. In the ON state of the device as shown in FIG. 8A, light L3 of said fourth spectral component b' having a p-polarization is received by said third image generating means 20b' for generating a respective third partial image Ib', the light L3' being reflected by said third image generating means 20b' in a s-polarized polarization state. Upon its s-polarization, said light L3' for said third partial image Ib' is reflected by the interface 11c of the second polarization selective beam splitting device 11 so as to be finally projected by the projection optics 100 after being transmitted through the dichroic beam splitting device 13.

In the OFF state for the panel of the third image generation means 20b', the polarization state p of the light L3 of the fourth spectral component b' is not changed so that after reflection at the interface of the third image generating means 20b' the reflected light L3", for instance the blue light is still in a p-polarized polarization state. Eventually, all of this reflected and p-polarized light L3" or blue light is completely transmitted at the polarization selective interface 11c of the second polarization selective or polarizing beam splitting device 11. Thus, no light is reflected in the direction to the projection optics 100. Therefore, a good contrast, i.e. a low black level, can be ensured.

To further block a possibly at the interface 11c reflected p-polarized light, a wavelength selective polarizer 23 may be provided between the second surface 11-2 of said second polarization selective or polarizing beam splitting device 11 and the second surface 13-2 of the dichroic beam splitting device 13. Said p-polarized light L2' of said third spectral component g', for instance of green light, can be transmitted in the ON state by said interface 11c of said second polarization selective beam splitting device 11 and said wavelength selective polarizer 23 device 23. In contrast, in the OFF state of the second image generating means 20g', the incident s-polarized light L2 of the third spectral component g' is not changed in its polarization state after reflection at the interface of the second image generating means 20g' in its OFF state. Consequently, the reflected light L2" of the third spectral component g' is reflected back to the first surface 11-1 of the second polarization selective or polarizing beam splitting device 11 upon reflection at the interface 11c thereof.

Said s-polarized light L3' of said fourth spectral component b', for instance of blue light, is reflected in the ON state by said interface 11c of said second polarization selective beam splitting device 11 and is transmitting said wavelength selective polarizer device 23. In contrast, in the OFF state the light L3" is p-polarized. Therefore most, e.g. 90%, amount of light L3" is transmitting said interface 11c and leaving the polarizing beam splitting device 11 at its first surface 11-1. But a smaller amount, typically about 10%, of light L3" is being reflected by said interface 11c and leaving the polarizing beam splitting device 11 at its second surface 11-2. To avoid this light to enter the projection optics, it is blocked by the wavelength selective polarizer, which is adapted to block p-polarized light of the fourth spectral component.

Figure 10:
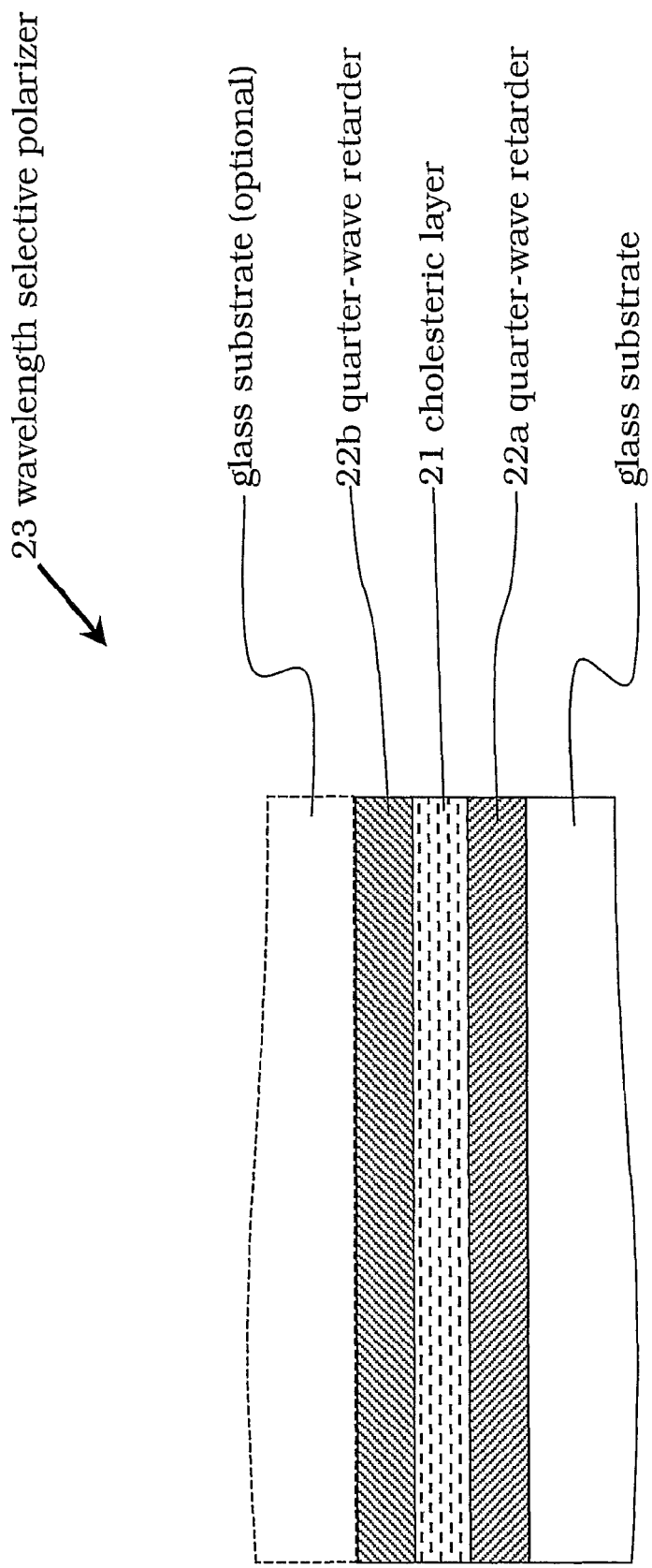
FIG. 10 is a cross-sectional sight view of a color selective polarizer which may be used in an embodiment of the inventive imaging unit.

One preferred realization of this wavelength selective retarder device 23 is shown in FIG. 10. A cholesteric layer 21 is stacked between two quarter-wave retarders 22a and 22b. The function of the quarter-wave retarders 22a and 22b is to change the polarization state of light from linear polarized to circular polarized polarization state and vice versa. The cholesteric layer 21 is adapted to reflect one circular polarization state of light of the fourth spectral component b' and to transmit the complementary circular polarization state of light of the fourth spectral component b'. The total stack of a cholesteric layer 21 and quarter-wave retarders 22a and 22b then is reflecting p-polarized light of the fourth spectral component b' whereas it is transmitting s-polarized light of the fourth spectral component b'. Light of the third spectral component g' is transmitting the cholesteric layer in all polarization states.

Figure 9:
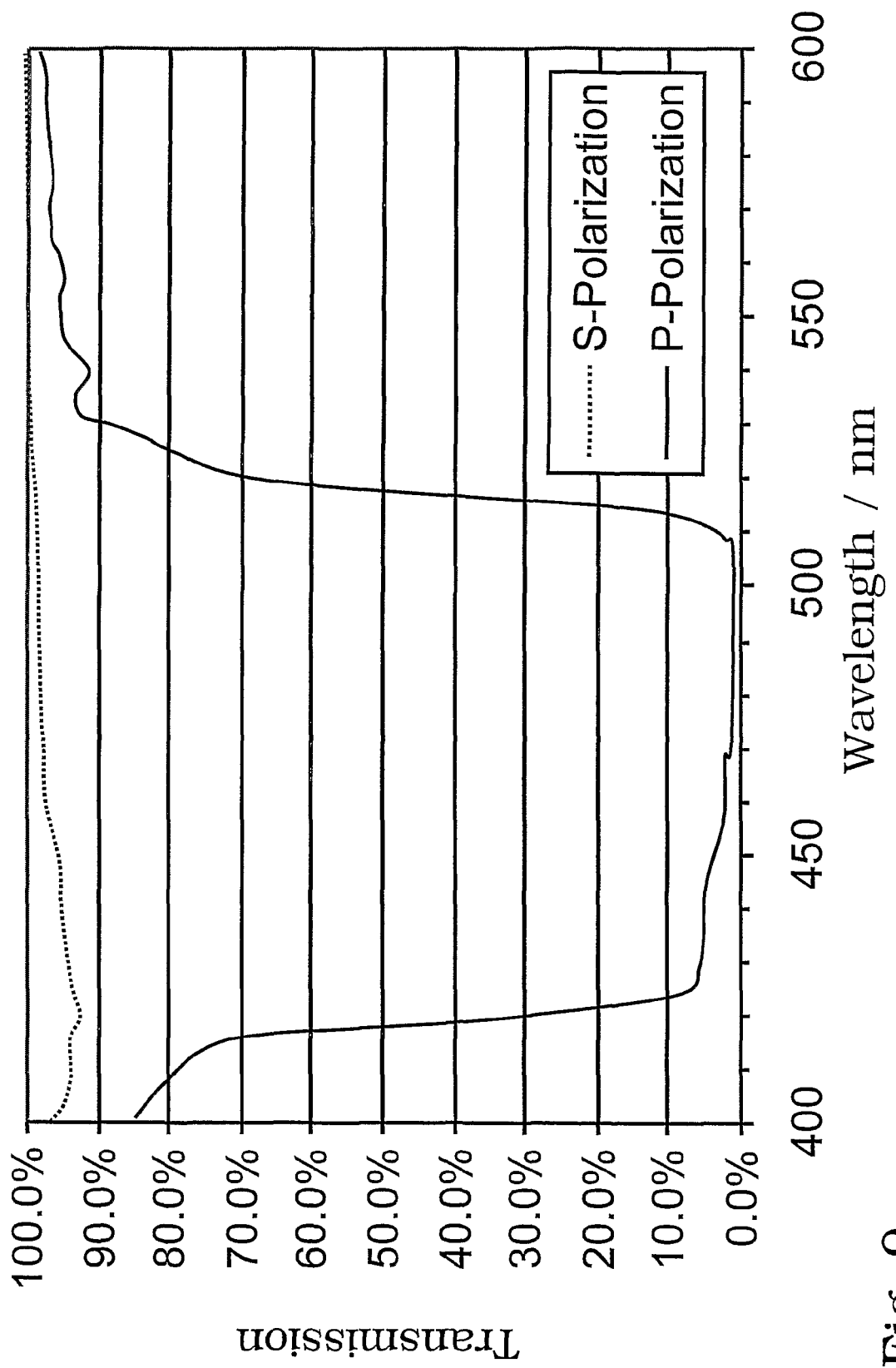
FIG. 9 is a graph for elucidating the characteristic of a color selective polarizer for contrast enhancement in a preferred embodiment of the present invention.

The explained transmission characteristic is shown in the spectrum of FIG. 9.

As alternatives for the cholesteric filter 21 in the wavelength selective retarder device 23 of FIG. 10 a color-selective retarder stack may be involved which changes the polarization state of the light L3 of the fourth spectral component, for instance of the blue light from the p-polarized to the s-polarized state and vice versa and keeps the polarization state of the light L2 of the fourth spectral component g', for instance of the green light, unchanged. In this case additionally a conventional absorptive polarizer might be necessary to block leaked blue light.

As a further additional object or alternative, a color-selective absorbing polarizer might be involved which absorbs p-polarized blue light and transmits p-polarized green light as well as s-polarized blue light.

The spectrum shown in FIG. 11 describes the transmittance of the wavelength selective polarizer device 23 of FIG. 10 for s-polarized and for p-polarized versus the wavelength. In particular the transmittance spectrum of the cholesteric layer 21 stacked between two quarter-wave retarders 22a, 22b is shown.

REFERENCE SYMBOLS

1 imaging unit according to the present invention
11 second polarizing beam splitting device
11-1 first surface
11-2 second surface
11-3 third surface
11-4 fourth surface
11c polarization selective interface
11f first surface
11s third surface
12 second polarizing beam splitting device
12-1 first surface
12-2 second surface
12-3 third surface
12-4 fourth surface
12c polarization selective interface
12f first surface
12s second surface
13 dichroic beam splitting device
13-1 first surface
13-2 second surface
13-3 third surface
13-4 fourth surface
13c wavelength selective interface
13f first surface
13s third surface
15 half-wave retarder
20b third image generating means, image generating means for blue
20g first image generating means, image generating means for green 20r second image generating means, image generating means for red
21 cholesteric layer
22 quarter-wave retarder
22a, 22b quarter-wave retarder
23 cholesteric filter
30 light source device, reflector, elliptical reflector, parabolic reflector
40 light-pipe
40f entrance
40s exit
45f fly eye lens system at entrance, fly eye integrator
45s fly eye lens system at exit, fly eye integrator
50 dichroic system, spectral selective system, dichroic mirror
51 dichroic mirror
52 folding mirror
53 folding mirror
54 half wave retarder, half wave plate
55 dichroic mirror
56, 56B wire grid polarizing beam splitter
57 polarizing beam splitter, polarizing beam splitter cube
60g folding optics (lenses and mirrors) for green channel
60m folding optics (lenses and mirrors) for magenta channel
60w folding optics (mirrors and lenses) for white channel
70 polarization converting system, PCS
71 half-wave retarder
80 spectral selective splitting member
100 projection optics
b, b' fourth spectral component blue
g, r' first spectral component green
I image to be generated/reproduced
Ib, Ib' third partial image
Ig, Ir' first partial image
Ir, Ig' second partial image
L1 light of first spectral component
L1' light of first partial image
L2 light of third spectral component
L2' light of second partial image
L3 light of fourth spectral component
L3' light of third partial image
m, t second spectral component, magenta
RI recombined image, reproduced image
SSP1 first spectral splitting and/or illumination part
SSP2 second spectral splitting and/or recombination part

The invention claimed is:

1. An imaging unit, for a projection engine for or with reflective display devices, comprising:
a first spectral selective splitting and/or illumination part to
provide and/or receive essentially white light,
split up said essential white light, of a first or s-polarized polarization state, into a first spectral component and a third and fourth spectral component, each spectral component being essentially complementary to the sum of the remaining two spectral components with respect to said essentially white light,
change a polarization state of the fourth spectral component into an essentially orthogonal polarization state from said s-polarized into a p-polarized polarization state, and
recombine said third and fourth spectral component in a spatially coincident manner into a second spectral component; and
a second spectral and polarization selective splitting and/or illumination part to
receive said first and second spectral components in a spatially separated manner and under non-coincident angles or a non parallel manner, said second spectral component comprising said third and fourth spectral component, wherein a polarization state of said third spectral component is essentially orthogonal to said polarization state of said fourth spectral component, said third spectral component being s-polarized and said fourth spectral component being p-polarized,
split up said second spectral component into a third spectral component and a fourth spectral component being essentially complementary to said third spectral component with respect to said second spectral component,
generate first, second, and third partial images of an image to be generated and/or to be reproduced using said first, third, and fourth spectral components, respectively, and
recombine said first, second, and third partial images to a recombined image being representative of an image to be generated and/or to be reproduced, wherein
said second spectral and polarization selective splitting and/or illumination part comprises a dichroic beam splitting device and first and second polarization selective or polarizing beam splitting devices,
a wavelength selective polarizer is provided between a second surface of said second polarization selective or polarizing beam splitting device and said dichroic beam splitting device,
said wavelength selective polarizer is configured to transmit a p-polarized part of said second partial image,
said wavelength selective polarizer is configured to transmit an s-polarized part of said third partial image, and
said wavelength selective polarizer is configured to block a p-polarized part of said third partial image.

2. The imaging unit according to claim 1, wherein
said first polarization selective or polarizing beam splitting device is configured to receive light of said first spectral component of said first or s-polarized polarization state, or a derivative thereof, from said first spectral selective splitting and/or illumination part.

3. The imaging unit according to claim 1, wherein
said first polarization selective or polarizing beam splitting device comprises a first surface configured to have light of said first spectral component of said first or s-polarized polarization state enter said first polarizing beam splitting device.

4. The imaging unit according to claim 1, wherein
said first polarization selective or polarizing beam splitting device comprises a second surface configured to have light of said first spectral component of said first or s-polarized polarization state exit said first polarization selective or polarizing beam splitting device, to have said light of said first spectral component interact with a first image generating means for said first partial image.

5. The imaging unit according to claim 4, wherein
said second surface of said first polarization selective or polarizing beam splitting device is configured to have said light of said first partial image of a second or p-polarized polarization state and waste light of a negative of said first partial image of said first or s-polarized polarization state enter said first polarization selective or polarizing beam splitting device.

6. The imaging unit according to claim 1, wherein
said first polarization selective or polarizing beam splitting device comprises a third surface configured to have light of said first partial image of a second or p-polarized polarization state left exit said first polarization selective or polarizing beam splitting device.

7. The imaging unit according to claim 1, wherein
said first polarization selective or polarizing beam splitting device comprises a polarization selective interface is configured to
essentially reflect light of said first or s-polarized polarization state,
essentially transmit light of a second or p-polarized polarization state,
reflect and redirect light of said first spectral component from a first surface of said first polarization selective or polarizing beam splitting device to a second surface of said first polarization selective or polarizing beam splitting device,
transmit said light of said first partial image from said second surface of said first polarization selective or polarizing beam splitting device to a third surface of said first polarization selective or polarizing beam splitting device, and
reflect light of a negative of said first partial image from said second surface of said first polarization selective or polarizing beam splitting device to said first surface of said first polarization selective or polarizing beam splitting device.

8. The imaging unit according to claim 1, wherein
said second polarization selective or polarizing beam splitting devices is configured to split up said second spectral component into said third and fourth spectral components.

9. The imaging unit according to claim 1, wherein
said second polarization selective or polarizing beam splitting device is configured to receive light of said second spectral component of said first or s-polarized polarization state and/or of a second or p-polarized polarization state, or a derivative thereof, from said first spectral selective splitting and/or illumination part.

10. The imaging unit according to claim 1, wherein
said second polarization selective or polarizing beam splitting device comprises a first surface configured to have light of said second spectral component and of said third and fourth spectral components of said first or s-polarized polarization state and/or of a second or p-polarized polarization state enter said second polarization selective or polarizing beam splitting device.

11. The imaging unit according to claim 1, wherein
said second polarization selective or polarizing beam splitting device comprises a second surface configured to have light of said second and third partial images of said first or s-polarized polarization state and light of a second or p-polarized polarization state exit said second polarization selective or polarizing beam splitting device, to have said light of said second and third partial images interact with said dichroic beam splitting device.

12. The imaging unit according to claim 1, wherein
said second polarization selective or polarizing beam splitting device comprises a third surface and a fourth surface being respectively configured to
have light of said second spectral component and in particular light of said fourth spectral component and light of said third spectral component of said first or s-polarized polarization state and/or of a second or p-polarized polarization state exit said second polarization selective or polarizing beam splitting device, to have said light of said second spectral component and of said third and fourth spectral components interact with respective second and third image generating means in order to generate light of said second and third partial images and therefore said second and third partial images,
to have light of said second and third partial images respectively enter said second polarization selective or polarizing beam splitting device, and/or
to have light of negatives of second and said third partial images enter said second polarization selective or polarizing beam splitting device.

13. The imaging unit according to claim 11, wherein
said second surface of said second polarization selective or polarizing beam splitting device is configured to have light of said second and third partial images of a second or p-polarized polarization state and/or in said first or s-polarized polarization state exit said second polarization selective or polarizing beam splitting device.

14. The imaging unit according to claim 1, wherein
said second polarization selective or polarizing beam splitting device comprises a polarization selective interface configured to
essentially reflect light of said first or s-polarized polarization state and to essentially tranmit light of a second or p-polarized polarization state, and/or
reflect and redirect light of said third spectral component from a first surface of said second polarization selective or polarizing beam splitting device to a fourth surface of said second polarization selective or polarizing beam splitting device, and/or
transmit light of said second partial images from said fourth surface of said second polarization selective or polarizing beam splitting device to a second surface of said second polarization selective or polarizing beam splitting device, and/or
reflect a waste light of a negative of a partial image from said fourth surface of said second polarization selective or polarizing beam splitting device to said first surface of said second polarization selective or polarizing beam splitting device, and/or to transmit said light of said fourth spectral component from said first surface of said second polarization selective or polarizing beam splitting device to a third surface of said second polarization selective or polarizing beam splitting device, and/or
reflect and redirect said light of said third partial image from said third surface of said second polarization selective or polarizing beam splitting device to said second surface of said second polarization selective or polarizing beam splitting device, and/or
transmit said waste light of said negative of said partial image from said third surface of said second polarization selective or polarizing beam splitting device to said first surface of said second polarization selective or polarizing beam splitting device.

15. The imaging unit according to claim 1, wherein
said dichroic beam splitting device is configured to
receive light of said first partial image from said first polarization selective or polarizing beam splitting device, and/or
receive light of said second and third partial images from said second polarization selective or polarizing beam splitting device.

16. The imaging unit according to claim 1, wherein
said dichroic beam splitting device comprises a first surface being configured to have light of said first partial image enter said dichroic beam splitting device.

17. The imaging unit according to claim 1, wherein
said dichroic beam splitting device comprises a second surface configured to have said light of said second and third partial images enter said dichroic beam splitting device.

18. The imaging unit according to claim 1, wherein
said dichroic beam splitting device comprises a third surface which is configured to have light of said first, second and third partial images exit said dichroic beam splitting device.

19. The imaging unit according to claim 1, wherein said dichroic beam splitting device comprises a spectral selective interface configured to
    essentially transmit light of said second and third partial images from a second surface of said dichroic beam splitting device to a third surface of said dichroic beam splitting device,
    essentially reflect light of said first partial image from a first surface of said dichroic beam splitting device to said third surface of said dichroic beam splitting device.

20. The imaging unit according to claim 1, wherein
said dichroic beam splitting device comprises a spectral selective interface configured to
    essentially reflect light of said second and third partial images from a second surface of said dichroic beam splitting device to a fourth surface of said dichroic beam splitting device, and/or
    essentially transmit light of said first partial image from a first surface of said dichroic beam splitting device to said fourth surface of said dichroic beam splitting device.

21. The imaging unit according to claim 1, wherein
said first polarization selective or polarizing beam splitting device and said dichroic beam splitting device are configured such that a third surface of said first polarization selective or polarizing beam splitting device and a first surface of said dichroic beam splitting device essentially face each other.

22. The imaging unit according to claim 1, wherein
a half-wave retarder device is provided between a third surface of said first polarization selective or polarizing beam splitting device and a first surface of said dichroic beam splitting device, to change a polarizing state of light of said first partial image exiting said first polarization selective or polarizing beam splitting device from a second or p-polarized polarization state to said first or s-polarized polarization state before entering said dichroic beam splitting device via said first surface thereof.

23. The imaging unit according to claim 1, wherein
a half-wave retarder device is provided between a second surface of said second polarization selective or polarizing beam splitting device and a second surface of said dichroic beam splitting device to
    change a polarizing state of light of a partial image exiting said second polarization selective or polarizing beam splitting device from a second or p-polarized polarization state to said first or s-polarized polarization state before entering said dichroic beam splitting device via a second surface thereof, and
    to change the polarization state of said light of said partial image exiting said second polarization selective or polarizing beam splitting device from said first or s-polarized polarization state to said second or p-polarized polarization state before entering said dichroic beam splitting device via said second surface.

24. The imaging unit according to claim 1, wherein
said second polarization selective or polarizing beam splitting device and said dichroic beam splitting device are configured such that a second surface of said second polarization selective or polarizing beam splitting device and a second surface of said dichroic beam splitting device essentially face each other.

25. The imaging unit according to claim 1, wherein
a polarization selective interface of said first polarization selective or polarizing beam splitting device and said second polarization selective or polarizing beam splitting device, respectively, and/or a dichroic or spectral selective interface of said dichroic beam splitting device are configured to essentially show a 45° -configuration and/or geometry.

26. The imaging unit according to claim 1, wherein
a polarization selective interface of said first polarization selective or polarizing beam splitting device and said second polarization selective or polarizing beam splitting device and/or a dichroic or spectral selective interface of said dichroic beam splitting device are configured to essentially show a non-45° -configuration and/or -geometry, essentially a 50° -configuration and/or -geometry.

27. The imaging unit according to claim 1, wherein
said first, second, and/or third partial images are generated by first, second, and/or third image generating means, said first, second, and/or third generating means are reflective liquid crystal display devices, liquid-crystal-on-silicon devices, and/or the like.

28. The imaging unit according to claim 1, wherein
the first spectral selective splitting and/or illumination part is configured to
    split up said essential white light of said first or s-polarized polarization state into said fourth spectral component and a fifth spectral component which is essentially complementary to said fourth spectral component with respect to said essentially white light,
    change said polarization state of the fourth spectral component into an orthogonal polarization state from said s-polarized polarization state to said p-polarized polarization state,
    to split up said fifth spectral component into said first and third spectral component which are essentially complementary to each other with respect to said fifth spectral component, and
    to recombine said third spectral component and said fourth spectral component in a coincident manner into said second spectral component.

29. The imaging unit according to claim 1, wherein
said first spectral selective splitting and/or illumination part comprises
    a first dichroic mirror to split up said essential white light into said fourth spectral component and a fifth spectral component which are essentially complementary to each other with respect to said white light,
    a second dichroic mirror to split up said fifth spectral component into said first spectral component and said third spectral component which are essentially complementary to each other with respect to said fifth spectral component, and
    a polarizing beam splitter to recombine said fourth spectral component and said third spectral component in a coincident and/or parallel manner to said second spectral component.

30. The imaging unit according to claim 1, wherein
said first spectral selective splitting and/or illumination part comprises
- a first dichroic mirror to split up said essential white light into said fourth spectral component and a fifth spectral component which are essentially complementary to each other with respect to said white light,
- a second dichroic mirror to split up said fifth spectral component into said first spectral component and said third spectral component which are essentially complementary to each other with respect to said fifth spectral component,
- a third dichroic mirror to recombine said fourth spectral component and said first spectral component in a coincident and/or parallel manner, and
- a first polarizing beam splitter to recombine said fourth spectral component and said first spectral component in a coincident and/or parallel manner and to split up said first spectral component.

31. The imaging unit according to claim 30, wherein said first spectral selective splitting and/or illumination part comprises a third dichroic mirror instead of said first polarization selective or polarizing beam splitting device to recombine said fourth spectral component and said first spectral component in a coincident and/or parallel manner.

32. The imaging unit according to claim 1, wherein said first spectral selective splitting and/or illumination part comprises a half waver retarder to change the polarization state of the fourth spectral component from said s-polarized polarization state to said p-polarized polarization state.

33. The imaging unit according to claim 1, wherein said first spectral selective splitting and/or illumination part comprises at least one polarizing beam-splitter of glass-prism and/or McNeill type.

34. The imaging unit according to claim 1, wherein said first spectral selective splitting and/or illumination part comprises at least one polarizing beam-splitter of wire-grid type.

35. The imaging unit according to claim 1, wherein said wavelength selective polarizer comprises a cholesteric layer stacked between first and second quarter-wave retarders,
said cholesteric layer is configured to reflect one circular polarized component of light in a wavelength range of said fourth spectral component and to transmit a complementary circular polarized component of light in a same wavelength range,
said cholesteric layer is configured to transmit all light of any polarization state outside the wavelength range of said fourth spectral component,
said first quarter-wave retarder is configured to convert incident linear polarized light into circular polarized light, and
said second quarter-wave retarder configured to convert outgoing circular polarized light into linear polarized light.

36. The imaging unit according to claim 35, wherein each of said first and second quarter wave retarders comprises two or more single wavelength quarter-wave retarders configured to convert linear polarized light into circular polarized light in a broad wavelength range.

37. The imaging unit according to claim 1, wherein said wavelength selective polarizer is an absorbing and wavelength selective polarizer, which is polarizing essentially within a wavelength range of said fourth spectral component and essentially non-polarizing outside this wavelength range.

38. The imaging unit according to claim 1, wherein
said wavelength selective polarizer comprises a wavelength selective retarder and an absorbing polarizer, said wavelength selective retarder facing a second surface of said second polarization selective or polarizing beam splitting device and said absorbing polarizer facing said dichroic beam splitting device,
said wavelength selective retarder and said absorbing polarizer are configured to either change a polarization state of light inside a wavelength range of said fourth spectral component to an orthogonal polarization state and to keep the polarization state of said light outside said wavelength range of said fourth spectral component essentially unchanged, said absorbing polarizer then being configured to absorb s-polarized light and transmitting p-polarized light, or
said wavelength selective retarder and said absorbing polarizer are configured to change the polarization state of light outside said wavelength range of said fourth spectral component to an orthogonal polarization state and to keep the polarization state inside said wavelength range of said fourth spectral component essentially unchanged, said absorbing polarizer then being configured to absorb p-polarized light and transmitting s-polarized light.

39. The imaging unit according to claim 1, wherein
only two polarization selective or sensitive surfaces and only one spectral selective or sensitive surface are necessary and are involved to split and recombine spectral components and/or partial images, respectively,
with a first polarization selective surface to split said second spectral component into said third and fourth spectral components of said second spectral and polarization selective splitting and/or illumination part and to recombine said third and second partial images to a combined partial image,
with one spectral selective surface to recombine said combined partial image with said first partial image to said recombined image representative for said image, and
with a second polarization selective surface to reflect said first spectral component and to transmit said first partial image to said one spectral selective or sensitive surface.

* * * * *